US010859678B2

(12) United States Patent
O'Keeffe

(10) Patent No.: US 10,859,678 B2
(45) Date of Patent: Dec. 8, 2020

(54) MICROMIRROR ARRAY FOR FEEDBACK-BASED IMAGE RESOLUTION ENHANCEMENT

(71) Applicant: James Thomas O'Keeffe, Mountain View, CA (US)

(72) Inventor: James Thomas O'Keeffe, Mountain View, CA (US)

(*) Notice: Subject to any disclaimer, the term of this patent is extended or adjusted under 35 U.S.C. 154(b) by 0 days.

(21) Appl. No.: 16/459,494

(22) Filed: Jul. 1, 2019

(65) Prior Publication Data

US 2019/0324124 A1 Oct. 24, 2019

Related U.S. Application Data

(63) Continuation-in-part of application No. PCT/US2017/069173, filed on Dec. 31, 2017.

(60) Provisional application No. 62/441,563, filed on Jan. 3, 2017, provisional application No. 62/441,627, filed on Jan. 3, 2017, provisional application No. 62/441,492, filed on Jan. 2, 2017.

(51) Int. Cl.
*G01S 7/481* (2006.01)
*G01S 7/4861* (2020.01)
*G01S 17/89* (2020.01)

(52) U.S. Cl.
CPC .......... *G01S 7/4817* (2013.01); *G01S 7/4861* (2013.01); *G01S 17/89* (2013.01)

(58) Field of Classification Search
None
See application file for complete search history.

(56) References Cited

U.S. PATENT DOCUMENTS 3,927,402 A 12/1975 Thompson
4,464,115 A 8/1984 Simpson et al.
(Continued)

FOREIGN PATENT DOCUMENTS

WO WO2016/011557 A1 1/2016

OTHER PUBLICATIONS

Tee-Ann Teo and Chi-Min Chiu, Pole-Like Road Object Detection From Mobile Lidar System Using a Coarse-to-Fine Approach, IEEE Journal of Selected Topics in Applied Earth Observations and Remote Sensing, vol. 8, No. 10, Oct. 2015 (Year: 2015).*
(Continued)

*Primary Examiner* — Yuqing Xiao
*Assistant Examiner* — Amir J Askarian

(57) ABSTRACT

In one embodiment an imaging system (e.g., a LIDAR or camera) contains a micromirror array that is configured in response to sensor data to dynamically enhance a complex shape region of interest in a field of view (FOV). The micromirror array functions as like an electronically controllable transfer function for light, between an input FOV and a detector array, thereby providing dynamically defined resolution across the detector array. Data from various configurations of the micromirror array is then combined in a 2D or 3D output image. In one aspect the imaging system begins with a first uniform resolution at the detector array and subsequently reconfigures the micromirror array to enhance resolution at a first portion of the detector array (e.g., spread an interesting object across more pixels) reduce resolution from in a less interesting part of a scene and thereby sample all of the original FOV with anisotropic resolution.

15 Claims, 25 Drawing Sheets

(56) References Cited

U.S. PATENT DOCUMENTS

| | | | |
|---|---|---|---|
| 4,627,734 | A | 12/1986 | Rioux |
| 4,688,937 | A | 8/1987 | Konig et al. |
| 4,943,157 | A | 7/1990 | Reding |
| 5,231,401 | A | 7/1993 | Kaman et al. |
| 5,638,164 | A | 6/1997 | Landau |
| 5,914,826 | A | 6/1999 | Smallwood |
| 6,055,490 | A | 4/2000 | Dunne |
| 6,091,037 | A | 7/2000 | Bachschmid |
| 7,064,817 | B1 | 6/2006 | Schmitt et al. |
| 7,089,114 | B1 | 8/2006 | Huang |
| 7,299,892 | B2 | 11/2007 | Radu et al. |
| 7,446,733 | B1 | 11/2008 | Hirimai |
| 7,608,948 | B2 | 10/2009 | Nearhoof et al. |
| 8,666,104 | B2 | 3/2014 | Ivey et al. |
| 8,675,887 | B2 | 3/2014 | Yuan et al. |
| 8,752,969 | B1 | 6/2014 | Kane et al. |
| 8,786,835 | B1 | 7/2014 | Reardon et al. |
| 8,878,901 | B2 | 11/2014 | Meinherz |
| 8,948,591 | B2 | 2/2015 | Scherbarth |
| 9,002,511 | B1 | 4/2015 | Hickerson et al. |
| 9,069,059 | B2 | 6/2015 | Vogt et al. |
| 9,097,800 | B1 | 8/2015 | Zhu |
| 9,121,703 | B1 | 9/2015 | Droz et al. |
| 9,128,190 | B1 | 9/2015 | Ulrich et al. |
| 9,199,643 | B1 | 12/2015 | Zeng |
| 9,279,796 | B1 | 3/2016 | Weisberg |
| 9,285,477 | B1 | 3/2016 | Smith et al. |
| 9,383,753 | B1 | 7/2016 | Templeton et al. |
| 9,625,582 | B2 | 4/2017 | Gruver et al. |
| 9,804,264 | B2 | 10/2017 | Villeneuve et al. |
| 10,151,836 | B2 | 12/2018 | O'Keeffe |
| 10,185,027 | B2 | 1/2019 | O'Keeffe |
| 10,302,746 | B2 | 5/2019 | O'Keeffe |
| 10,408,940 | B2 | 9/2019 | O'Keeffe |
| 2005/0057741 | A1* | 3/2005 | Anderson ............. G01S 7/4814 356/5.01 |
| 2005/0237218 | A1 | 10/2005 | Tang et al. |
| 2006/0104585 | A1 | 5/2006 | Cho |
| 2006/0161270 | A1 | 7/2006 | Luskin et al. |
| 2007/0024841 | A1 | 2/2007 | Kloza |
| 2007/0289860 | A1 | 12/2007 | Newman et al. |
| 2008/0068584 | A1 | 3/2008 | Mori et al. |
| 2009/0147239 | A1 | 6/2009 | Zhu et al. |
| 2009/0219962 | A1 | 9/2009 | Meyers et al. |
| 2009/0262760 | A1 | 10/2009 | Krupkin et al. |
| 2009/0273770 | A1 | 11/2009 | Bauhahn et al. |
| 2010/0026982 | A1* | 2/2010 | Kludas .................. G01C 15/00 356/4.01 |
| 2010/0177929 | A1 | 7/2010 | Kurtz et al. |
| 2011/0181201 | A1 | 7/2011 | Hollis |
| 2013/0127854 | A1* | 5/2013 | Shpunt ............... G01B 11/2518 345/420 |
| 2013/0222791 | A1 | 8/2013 | Steffey et al. |
| 2014/0240721 | A1 | 8/2014 | Herschbach |
| 2014/0270237 | A1 | 9/2014 | Wang et al. |
| 2014/0270264 | A1 | 9/2014 | Wang et al. |
| 2014/0350836 | A1 | 11/2014 | Stettner et al. |
| 2015/0185246 | A1 | 7/2015 | Dakin et al. |
| 2015/0192677 | A1 | 7/2015 | Yu et al. |
| 2015/0247703 | A1 | 9/2015 | Teetzel et al. |
| 2015/0286340 | A1 | 10/2015 | Send et al. |
| 2015/0307020 | A1 | 10/2015 | Salter et al. |
| 2015/0378011 | A1* | 12/2015 | Owechko .............. G01S 7/4817 356/4.01 |
| 2016/0047896 | A1 | 2/2016 | Dussan |
| 2016/0245919 | A1* | 8/2016 | Kalscheur ............... G01S 17/89 |
| 2016/0282468 | A1 | 9/2016 | Gruver et al. |
| 2017/0024877 | A1* | 1/2017 | Versace .............. G06K 9/00664 |
| 2017/0169703 | A1 | 6/2017 | Carrasco et al. |
| 2017/0176990 | A1 | 6/2017 | Keller et al. |
| 2017/0328990 | A1* | 11/2017 | Magee ..................... G01S 17/42 |
| 2018/0059248 | A1 | 3/2018 | O'Keeffe |
| 2018/0074175 | A1 | 3/2018 | O'Keeffe |
| 2018/0106890 | A1 | 4/2018 | O'Keeffe |
| 2018/0156896 | A1 | 6/2018 | O'Keeffe |
| 2018/0267556 | A1 | 9/2018 | Templeton .............. G01S 17/42 |
| 2019/0025427 | A1 | 1/2019 | O'Keeffe |
| 2019/0107711 | A1* | 4/2019 | Blanche ............. G02B 26/0808 |
| 2019/0120939 | A1 | 4/2019 | O'Keeffe |
| 2019/0196579 | A1* | 6/2019 | Shpunt ................... G06T 15/00 |

OTHER PUBLICATIONS

Reinhard Beger et al Data fusion of extremely high resolution aerial imagery and LiDAR data for automated railroad centre line reconstruction, ISPRS Journal of Photogrammetry and Remote Sensing vol. 66, Issue 6, Supplement, Dec. 2011, pp. S40-S51 (Year: 2011).*

Vojnovic; Notes on optical fibres and fibre bundles; Gray Institute, Department of Oncology, University of Oxford; 15 pages; retrieved from the internet ( http://users.ox.ac.uk/-atdgroup/referencematerial/Notes%20on%20optical%fibres%20and%fibre%20bundels.pdf); (year of pub. sufficiently earlier than effective US filing date and any foreign priority date) 2012.

O'Keeffe; U.S. Appl. No. 15/857,960 entitled "Planning a lidar scan with smart test vectors," filed Dec. 29, 2017.

O'Keeffe; U.S. Appl. No. 15/856,554 entitled "A vehicle-integrated system," filed Dec. 28, 2017.

O'Keeffe; U.S. Appl. No. 15/851,686 entitled Distributed laser range finder with fiber optics and micromirrors, filed Dec. 21, 2017.

* cited by examiner

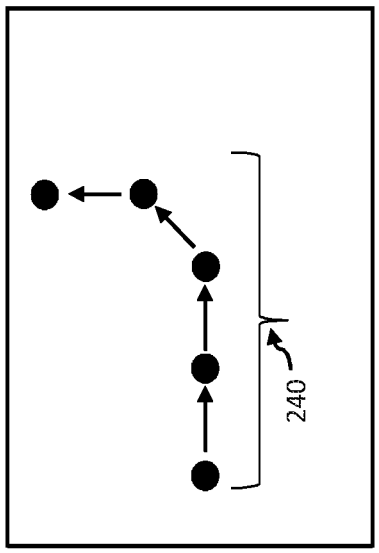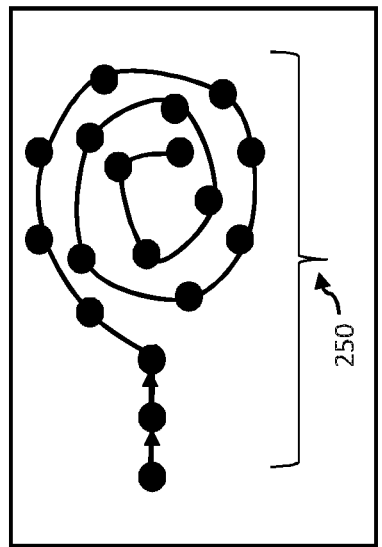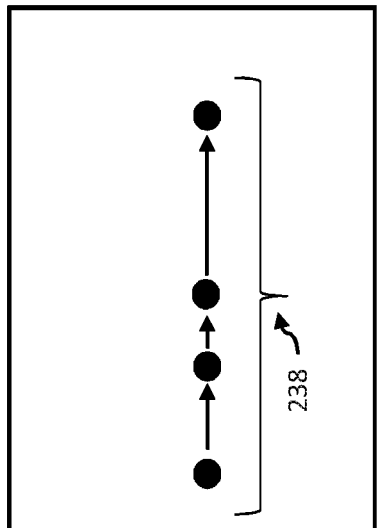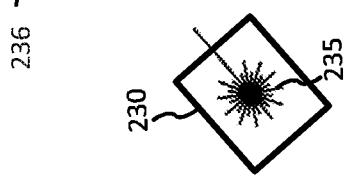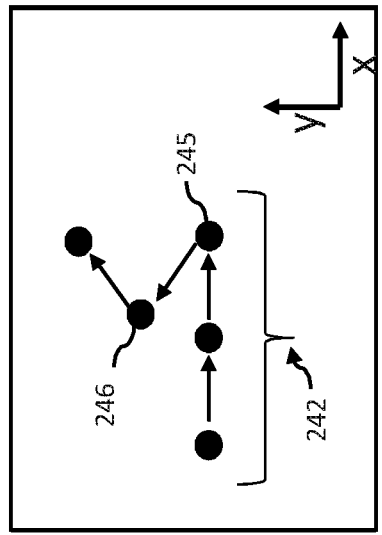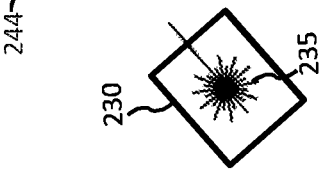

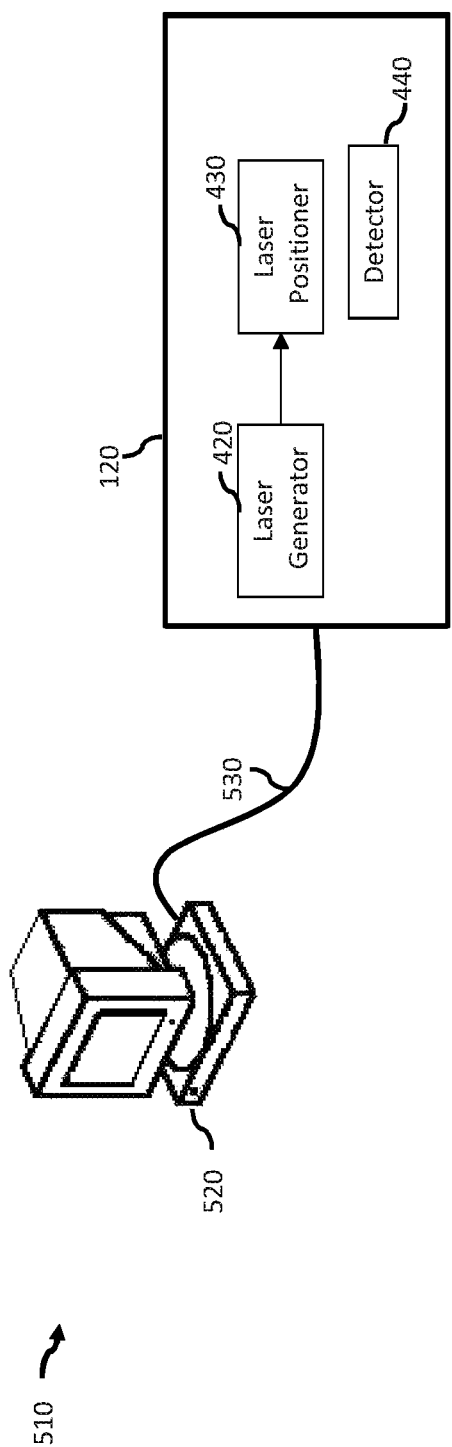
FIG. 5A
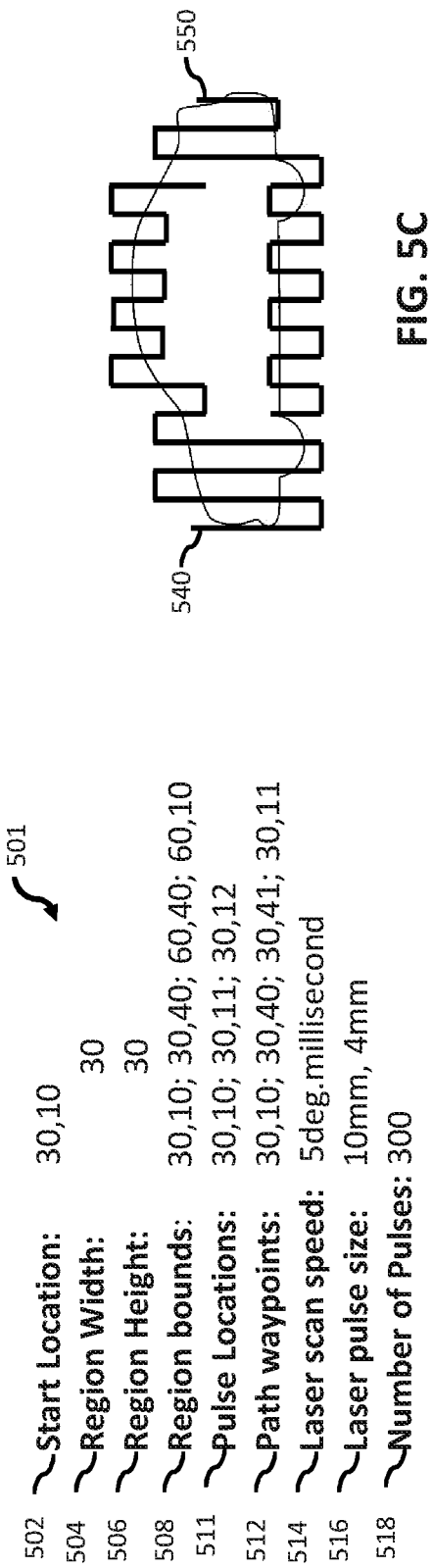
FIG. 5C
| | | |
|---|---|---|
| 502 | Start Location: | 30,10 |
| 504 | Region Width: | 30 |
| 506 | Region Height: | 30 |
| 508 | Region bounds: | 30,10; 30,40; 60,40; 60,10 |
| 511 | Pulse Locations: | 30,10; 30,11; 30,12 |
| 512 | Path waypoints: | 30,10; 30,40; 30,41; 30,11 |
| 514 | Laser scan speed: | 5deg.millisecond |
| 516 | Laser pulse size: | 10mm, 4mm |
| 518 | Number of Pulses: | 300 |
FIG. 5B

FIG. 14B

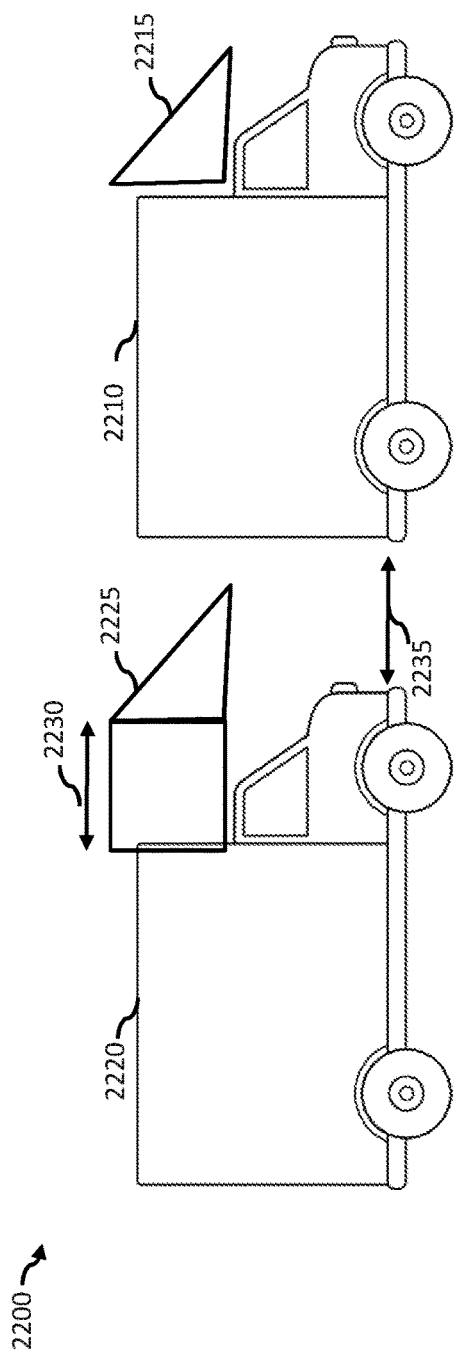
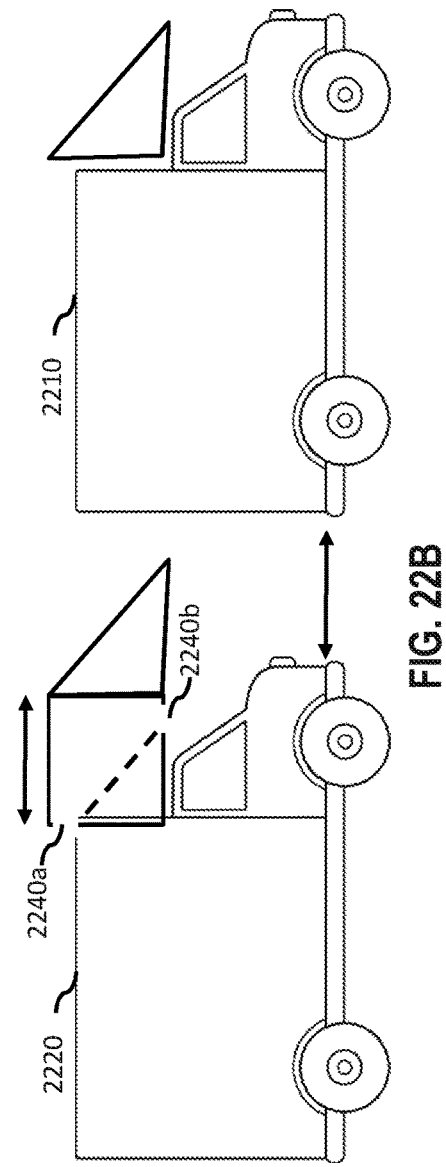
FIG. 22A
FIG. 22B

MICROMIRROR ARRAY FOR FEEDBACK-BASED IMAGE RESOLUTION ENHANCEMENT

CROSS REFERENCE TO RELATED APPLICATIONS

This application is a continuation-in-part of International Application No. PCT/US2017/069173, filed Dec. 31, 2017; which application claims the benefit of the following: U.S. Provisional Application No. 62/441,492, filed Jan. 2, 2017, titled DYNAMICALLY STEERED LASER RANGE FINDING FOR OBJECT LOCALIZATION, and U.S. Provisional Application No. 62/441,563, filed Jan. 3, 2017, titled ELECTRONICALLY STEERED LIDAR WITH DIRECTION FEEDBACK, and U.S. Provisional Application No. 62/441,627, filed Jan. 3, 2017, titled LASER RANGE FINDING WITH DYNAMICALLY CONFIGURED MICROMIRRORS, all by the present inventor; the disclosures of which are fully incorporated by reference herein.

INCORPORATION BY REFERENCE

All publications and patent applications mentioned in this specification are herein incorporated by reference to the same extent as if each individual publication or patent application was specifically and individually indicated to be incorporated by reference.

BACKGROUND

In digital photography a charge-coupled-device CCD sensor can gather light from several million directions simultaneously to generate detailed images. In contrast, many light detection and ranging systems (LIDARs) scan or rotate laser beams to measure the time of flight in a sequence of directions. The sequential measurement nature limits the total number of range measurements per second. Hence a LIDAR that scans a FOV in a uniform deterministic manner can provide poor angular resolution. In a related area analog micromirror arrays have been proposed for providing zoom properties in digital cameras. Zooming in (e.g., narrowing the FOV) to enhance image quality can be effective for both 2D photography and 3D time-of-flight cameras (e.g., Flash LIDARs). However there are circumstances where a wide field of view and enhanced image quality are both desirable. U.S. Pat. No. 9,383,753 to Templeton discloses a LIDAR with dynamically adjustable angular resolution, but only describes dynamic angular velocity in a single axis for a rotating LIDAR. U.S. Pat. No. 9,383,753 further assumes a rotating LIDAR and does not provide for arbitrary laser orientation within a scan. Hence, dynamically adapting LIDAR or camera measurement density within a scan, to improve the accuracy of object boundary detection in the FOV remains a challenge.

SUMMARY

In one aspect a micromirror array can act like an electronically controllable transfer function for light, between an input lens of a camera or LIDAR and a photodetector array. For example an analog micromirror array can perform a zoom function by reconfiguring some or all of the micromirrors to deflect light rays from a portion of an available FOV onto the photodetector array while simultaneously spreading the portion over more elements of the photodetector. This has the effect of increasing image resolution (e.g., the number of photodetector elements per unit solid angle of the field of view or pixels per square degree or elements per steradian in the FOV). However reconfiguring the micromirror array to increase the resolution of a portion of a FOV can have the drawback of reducing the total angular range (FOV) measured by the photodetector array (i.e., zooming in on the scene can have the effect of increasing the resolution while decreasing the total FOV or 2D angular range sensed). While micromirror arrays can be configured into microlens, thereby enhancing image resolution, there are many times when a wide FOV (i.e., maintaining an original 2D angular range of the scene detected by photodetector array) is also desirable.

A system and method are provided to sense a specified FOV with enhanced resolution. In one embodiment a method performed by an imaging system comprises providing at an aperture a 2D field of view (FOV) from a scene to a micromirror array having a first configuration, and thereby deflecting light with the micromirror array from the FOV onto a photodetector array. The method further comprises detecting with the photodetector array a first set of light measurements spanning the FOV, processing the first set of light measurements and thereby identifying a region of interest (e.g., a region surrounding an object edge or a face), in the FOV. The set of light measurements can have a first resolution in the region of interest, based on the angular range that each element in the photodetector array receives, for example 1 light measurement or 1 photodetector element per one square degree of solid angle in the FOV. The first resolution can be based on the first configuration of the micromirror array. The method further comprises configuring the micromirror array based at least in part on the identified region of interest and thereby detecting with the photodetector array a second set of light measurements spanning the FOV with a second resolution in the region of interest that is greater than the first resolution.

In one aspect the method can conserve the size (e.g., angular range) of the original FOV, thereby keeping people and pets in the frame of the resulting 2D images and not distracting a user with an unwanted zoom effect. In another aspect the method can enhance image resolution while simultaneously conserving the original FOV; by configuring the micromirror array to compress light rays from one or more uninteresting portions of the FOV onto fewer pixels in the photodetector array (e.g., based on the first set of light measurements) and thereby enabling light rays from the region(s) of interest to be spread over more pixels to enhance the resolution. Therefore, by creating areas of sparse and denser light rays on the photodetector array simultaneously the original FOV is conserved.

In a system embodiment a processing subassembly with access to both sensor data from the photodetector array and a micromirror configuration can correct for the distortive effect of the dense and sparse zones on the photodetector array and generate an eye-pleasing output image. In another embodiment, data from sensors or sources other than the photodetector array can be used to identify the region(s) of interest. In a second embodiment a method performed by an imaging system comprises: Processing sensor data indicative from a scene in the vicinity of a micromirror array and thereby identifying a region of interest in the sensor data, wherein the micromirror array has a field of view encompassing at least some of the scene, wherein the micromirror array comprises a plurality of micromirrors with an initial configuration that deflects light from the region of interest towards a detector array and thereby provides a first resolution at the detector array for the light from the region of interest. The method further comprises reconfiguring at least a subset of the plurality of micromirrors in the micromirror array, based at least in part on the identified region of interest and thereby providing at the detector array a second resolution for light form the region of interest that is greater than the first resolution. In a third embodiment the micromirror array can be part of a ranging subassembly in a LIDAR. For example, a flash LIDAR can illuminate a field of view (FOV) with flashes of light (e.g., laser light) and gather reflections from the FOV at a photodetector array. A micromirror array can be configured based on an identified region of interest to non-uniformly spread the light reflections from the flashes of light based on the identified region of interest.

In a second group of embodiments a LIDAR performs a progressive boundary localization (PBL) method to determine the location of time-of-flight (TOF) boundaries to within some minimum angular spacing in a FOV (i.e., progressively resolve the boundaries of objects in environment local to the LIDAR). The method can generate a sequence of laser pulses, measure a corresponding sequence of laser reflections and measure a time of flight and direction corresponding to each of the laser pulse. In response to identifying a nearest neighbor pair of laser pulses within a range of directions for which the TOF difference is greater than a TOF threshold, dynamically steering the LIDAR to generate one or more intervening laser pulses with directions based on at least one of the nearest neighbor pair directions. The method can continue until all nearest neighbor pairs for which the TOF difference is greater than a TOF threshold have an angular separation (i.e., difference in directions for the laser pulses in each pair) less than a direction threshold (e.g., less than 0.5 degrees direction difference). In this way a PBL method can localize the boundary by refining the angular ranges in which large changes in TOF occur until such ranges are sufficiently small.

In third group of embodiments a method to perform extrapolation-based progressive boundary localization method (EPBL) with a LIDAR is disclosed. The method can use a LIDAR to find a first portion of a boundary in the FOV, extrapolate the direction of the boundary and thereby dynamically steer the LIDAR to scan in a second region of the FOV for the boundary. Hence the continuous and "straight-line" nature of object boundaries can be used to dynamically steer a LIDAR to scan the boundary. Similarly a classified object (e.g., a Van) can have a predicted boundary such that finding one part of the object and extrapolating or predicting a second portion of the object boundary (e.g., based on classification or a straight line edge in an identified direction) is used to dynamically steer a LIDAR scan. In one example, a LIDAR scans a first search region within a FOV, identifies a first set of locations or sub-regions of the first search regions that located on or intersected by a TOF boundary (e.g., an object edge). The exemplary EPBL method then extrapolates an estimated boundary location, outside the first search region, based on the first set of locations or sub-regions. The LIDAR then uses the estimated boundary location to configure or dynamically steer a laser within a second search region. The LIDAR can then process reflections form the second search region to determine if the boundary exists in the estimated boundary location.

Advantages

The techniques described in this specification can be implemented to achieve the following exemplary advantages:

An imaging system with feedback-based micromirror configuration can increasing resolution in regions of interest, decrease resolution elsewhere in a FOV and improve image quality while maintaining the original FOV.

In a related advantage a first configuration of the micromirror array can uniformly spread the incoming FOV from a lens across a detector array. The array can generate first sensor data. A second configuration of the micromirror array can reconfigure a complex shaped plurality of the micromirrors to increase resolution in regions on interest and thereby generate second sensor data. Processing circuitry can use knowledge of the first and second configurations to combine the first and second data to generate a single image. The single image can comprise enhanced resolution in the regions of interest (e.g., at time of flight or color boundaries, around objects, faces, or intensity boundaries) from the second sensor data and background non-enhanced portions from the first sensor data. The micromirror mirror array can be reconfigured faster than a traditional zoom lens, thereby reducing motion distortion when combining first and second data.

In another advantage several embodiments provide for dynamically identifying a complex shaped region of interest (e.g., surrounding a vehicle) that can then be used to reconfigure a corresponding complex shaped subset of micromirrors. A complex shape region of interest can be a complex shape subset of a FOV and can include simple and complex curves or multiple sides (e.g., 5 or more distinct sides).

In another advantage various computer processing techniques can be used to identify regions of interest such as object classification, boundary detection, boundary extrapolation (e.g., predicting a location of some or all of a boundary), iterative boundary localization, facial recognition, location classification (e.g., urban, rural, or indoor). Computer processing techniques used to identify regions of interest from sensor data can use sensor fusion (e.g., combining multiple types of data), can prioritize or score regions of interest. In a related advantage computer processing can generate a profile or range of resolutions by reconfiguring a plurality of micromirrors. For example a region of interest can cause a subset of micromirrors to generate a resolution of 10 detector elements per square degree at the center of a region of interest in the FOV. The circuitry can further reconfigure a second subset of the micromirrors to generate lower resolution of 5 detector elements per square degree at the detector array for a portion of the region of interest surrounding the center of the region of interest.

In another advantage micromirror array can be iteratively reconfigured to progressively enhance resolution based on sensor data gathered from a previous iteration. Hence a micromirror array in a LIDAR could iteratively select regions of interest in which time of flight discrepancies indicate depth or range differences. After each iteration the detector array can generate sensor data indicating subsets of the previous regions of interest in which boundaries still require localization, thereby forming new regions of interest.

In another advantage, data-drive reconfiguration of the micromirror array enables a smaller photodetector array to perform like a more expensive, larger detector array. For example, consider an imaging system with a 100×100 degree FOV sensed with a 200×200 pixel or element photodetector array. The total angular area of the FOV is 100×100 or 10,000 square degrees. The total number of photodetector elements is 40000 and the average angular resolution is 4 pixels per square degree. An embodiment of the present disclosure can identify a region of interest with a complex shape (e.g., a hexagonal 2D shape with area of 100 square degrees in the FOV). The imaging system can then configure a micromirror array to increase the resolution to 100 pixels per square degree for a region of interest (e.g., equivalent to the average resolution of a 1000×1000 element photodetector). The imaging system can reduce the resolution to 3 pixels per square degree in the remainder of the FOV outside the region of interest, so as to sample the entire FOV. In this way the imaging system can sample the same 100×100 FOV while acting like a more expensive 1000× 1000 element photodetector array in the region of interest.

In a related advantage the imaging system of the previous example can generate a smaller set of sensor data using anisotropic resolution and only increasing resolution in selected region(s) of interest.

Instead of generating a uniform laser pulse density throughout the FOV, the disclosed techniques provide for non-uniform laser pulse density by dynamically steering a laser based on data indicating the location of important features in the FOV (e.g., boundaries of an object, a person recognized in digital image). This data-driven non-uniform laser pulse spacing has the further benefit of further localizing the important features.

In another advantage the boundaries of objects in the FOV can be localized by refining laser steering parameters in regions of the FOV. The disclosed techniques can improve speed detection for objects in the FOV. The accuracy of speed detection in a laser range finding scan is related to the ability to accurately determine the object boundary during each scan. The disclosed techniques can estimate the boundary location and dynamically steer the laser to investigate the boundary location.

The disclosed techniques enhance the speed of object classification, using boundary localization and dynamic laser pulse density selection.

BRIEF DESCRIPTION OF THE DRAWINGS

FIGS. 2B, 2C, 2D, 2E and 2F illustrate dynamically steered LIDARs generating a variety of non-uniformly distributed sequences of laser pulses, according to embodiments of the present disclosure.

FIG. 5A illustrates an exemplary laser range finding system including a processing subassembly and a steerable laser assembly connected by a communication link, according to an embodiment of the present disclosure.

FIGS. 5B and 5C illustrate exemplary laser steering parameters according to an aspect of the technology.

FIG. 14B illustrates a micromirror array operable to focus portions of a FOV onto a detector array according to an embodiment of the present disclosure.

FIGS. 22A and 22B illustrate several aspects of a system to improve aerodynamic efficiency of a drafting vehicle.

DETAILED DESCRIPTION

Figure 1A:
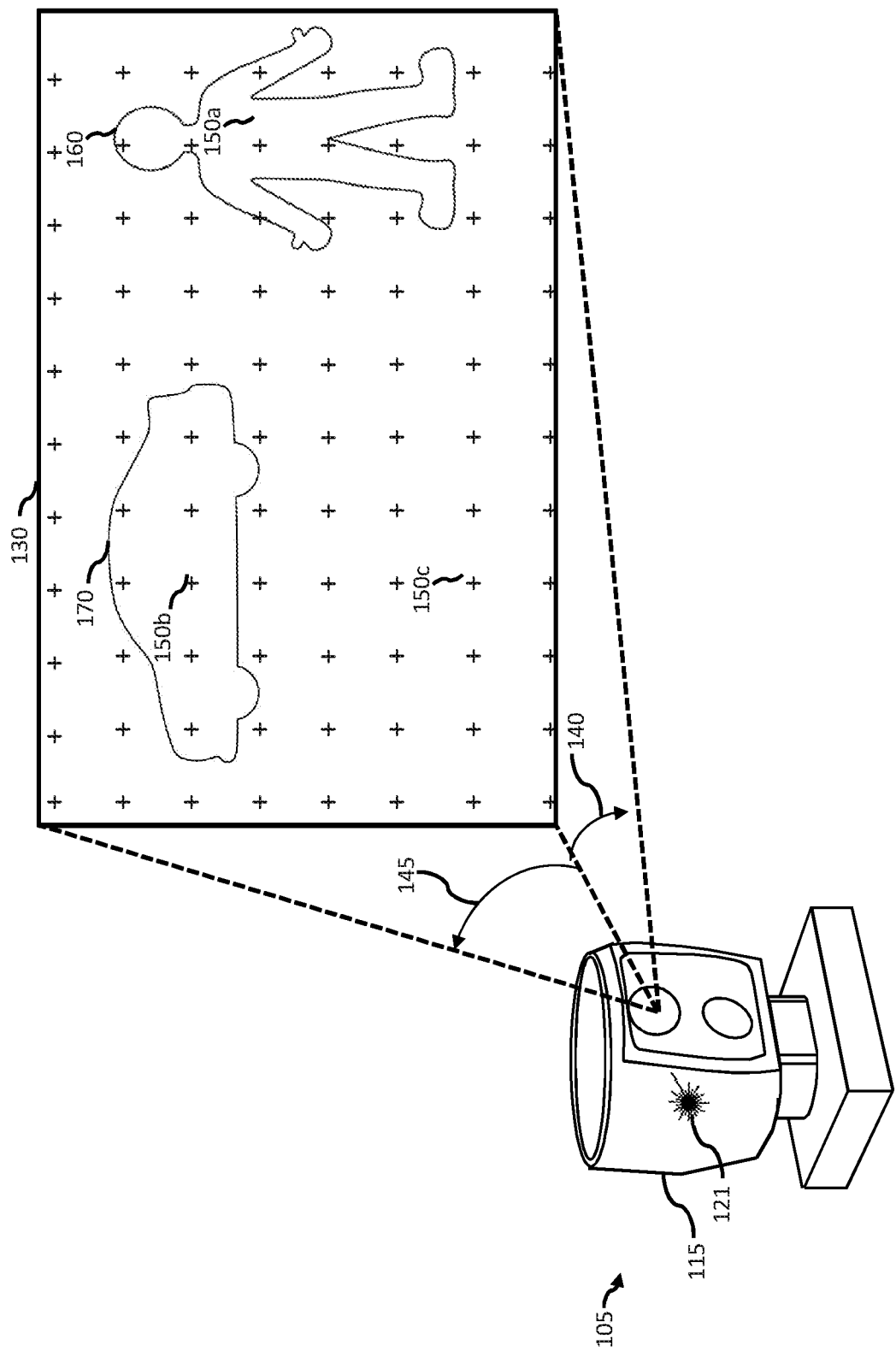
FIGS. 1A and 1B are exemplary diagrams of a laser range finder and a plurality of laser pulse locations in a field of view, according to an embodiment of the present disclosure.

In digital photography light from is received at a sensor form many points in the local environment at once. In contrast, a laser range finder can use a relatively small number of lasers (e.g., 1-64) to generate laser pulses aimed sequentially at a number of points (e.g., 100,000) to perform laser ranging scans of the FOV. Hence, the laser pulses (e.g., and corresponding time of flight measurements in discrete directions) represent a scarce resource and the FOV is often undersampled with respect to sensing detailed boundaries of objects in the local environment. Many LIDARs mechanically rotate with a constant or nearly constant angular velocity. Such rotating LIDARs can sweep one or more lasers through a deterministic range of directions (e.g., each laser sweeping through a 360 degree azimuthal range at a fixed elevation angle). This type of operation does not constitute dynamically steering the laser(s) in a LIDAR. The angular momentum of the spinning portion in a mechanical LIDAR prevents rapid changes in angular velocity. Each laser in a mechanical LIDAR can generate a uniformly spaced sequence of laser pulses in a 1-D angular range. The angular velocity can be selected for many mechanical LIDAR (e.g., 5-20 Hz for the HDL-64E from Velodyne Inc. or Morgan Hill, Calif.), but remains constant from one rotation to the next.

A uniform scan of the entire FOV is simple and somewhat inherent in rotating LIDARS, but is sub-optimal for gathering the most information from the FOV. For example, large sections of the FOV (e.g., Walls and roads) can return a predictable, time invariant, homogeneous response. A modern LIDAR can scan over 2 million points per second. Hence one embodiment of the present technology tries to select the 2 million scan points with the most information (e.g., edges or boundaries) by steering the laser in a dynamic manner.

Recently, advancements in electronically-steerable lasers and phased array laser beam forming have made it possible to dynamically steer a laser within a FOV. A steerable laser can be mechanically-steerable (e.g., containing moving parts to redirect the laser) or electronically-steerable (e.g., containing an optical phased array to form a beam at in one of many directions). For the purpose of this disclosure a steerable laser is a laser assembly (e.g., including positioning components) that can change the trajectory or power level of a laser beam. For the purpose of this disclosure a steerable laser is dynamically steerable if it can respond to inputs (e.g., user commands) and thereby dynamically change the power or trajectory of the laser beam in the course of a scan of the FOV. For the purpose of this disclosure dynamically steering a laser is the process of providing input data (e.g., instructions such as laser steering parameters) to a steerable laser that causes the laser to dynamically modulate the power or trajectory of the laser beam during a scan of the FOV. For example, a laser assembly that is designed to raster scan a FOV with a constant scan rate (e.g., 10 degrees per second) and pulse rate (e.g., 10 pulses per second) is not being dynamically steered. In another example, the previous laser assembly can be dynamically steered by providing input signals and circuitry that dynamically changes the angular velocity of the laser assembly to generate non-uniformly spaced laser pulses in the FOV, based on the input signals (e.g., thereby generating an image on a surface in the FOV). A trajectory change can be a direction change (i.e., a direction formed by a plurality of pulses) or a speed change (i.e., how fast the laser is progressing in a single direction across the FOV). For example, dynamically changing the angular speed across a FOV of a pulsed laser with a constant direction causes the inter-pulse spacing to increase or decrease thereby generating dynamically defined laser pulse density.

In the context of the present disclosure most rotating LIDAR do not comprise dynamically steerable lasers since neither the power nor the trajectory of the laser beam is dynamically controllable within a single scan. However a rotating or mechanical LIDAR can be dynamically steered. For example, by providing input data that causes the laser to dynamically vary the laser pulse rate within a scan of the FOV, since the net result is a system that can guide or steer the laser to produce a non-uniform density laser pulse pattern in particular parts of the FOV.

Recently, electronically scanned LIDAR such as the model S3 from Quanergy Inc. of Sunnyvale, Calif. have been developed. These solid-state electronically scanned LIDAR comprise no moving parts. The absence of angular momentum associated with moving parts enables dynamic steering of one or more lasers in electronically scanned solid-state LIDAR systems.

In many laser range finding systems the laser is periodically pulsed and the exact pulse location in the FOV cannot be controlled. Nevertheless such a periodic pulse laser can be used with the present disclosure to produce a complex shaped region of higher pulse density than the area surrounding the region by increasing the laser dwell time within the region. In this way a periodically pulsed laser will produce a greater density of pulses in the complex shaped region of a FOV. For the purpose of this disclosure a complex shaped region is a region having a complex-shaped perimeter such as a perimeter with more than four straight edges or a perimeter with one or more curved portions and two or more distinct radii of curvature. Exemplary complex-shaped regions are, a region with a pentagonal perimeter, a hexagonal perimeter an elliptical perimeter or a perimeter capturing the detailed outline of a car. Other laser range finding systems transmit a continuous laser signal, and ranging is carried out by modulating and detecting changes in the intensity of the laser light. In continuous laser beam systems time of flight is directly proportional to the phase difference between the received and transmitted laser signals.

In one aspect the dynamically steered laser range finder can be used to investigate a FOV for boundaries associated with objects. For example, a small shift in the position of the LIDAR laser may identify a large change in TOF associated with the edge of an object 100 ft away. In contrast RADAR has much greater beam divergence and hence a much wider spot size impacts the object (often many times the object size). Hence the reflections from beam scanned RADAR represent the reflections from many points on the object, thereby making beam steered RADAR useful for object detection but impractical for performing detailed boundary localization. Hence, due in part to the large beam divergence of RADAR beams, a small change in radar beam direction can provide little if any actionable information regarding the edges of an object. In contrast the spot size of the laser remains small relative to the boundary of many important objects (people, dogs, curbs). The present technology can enable the boundaries (e.g., edges) of objects to be dynamically determined by a process of iteratively refining the scan points for the electronically steered LIDAR. For example, the LIDAR can use a bisection algorithm approach to iteratively search for the boundary of a pedestrian in the FOV. The LIDAR could first receive an indication that point P1 in a point cloud has a TOF consistent with the pedestrian and can scan iteratively to the right and left of P1 with decreasing angular range (e.g., in a bisection approach) to estimate the exact location of the boundary between the pedestrian and the surrounding environment. In general, this technique can be used to dynamically configure a laser in a LIDAR to investigate changes in TOF within a point cloud to iteratively improve boundary definition.

FIG. 1A illustrates a laser range finder system 105 (e.g., a LIDAR) that comprises a steerable laser assembly 115. Steerable laser assembly 115 scans one or more a lasers (e.g., steerable laser 121) within a field of view FOV 130. The field of view 130 can be defined by an azimuthal (e.g., horizontal) angular range 140 and an elevation (e.g., vertical) angular range 145. Steerable laser 121 scans FOV 130 and generates a plurality or sequence of laser pulses, (e.g., laser pulses 150a, 150b and 150c) in a sequence of directions. The direction in the FOV of the each of the plurality of laser pulses is illustrated with a "+" symbol. Some of the laser pulses (e.g., 150a and 150b) can be reflected by objects (e.g., person 160 and vehicle 170). In the embodiment of FIG. 1A the laser pulses are evenly spaced in the FOV, such that the angular separation between neighboring laser pulses is a constant value in one or both of the horizontal and vertical directions. Accordingly, only a few of the laser pulses (e.g., 5-6 pulses) reflect from each of the objects 160 and 170 due in part to the uniform laser pulse density throughout the FOV. For the purpose of this disclosure the FOV of laser range finder 110 can be defined as the set of all directions (e.g., combinations of elevation and azimuthal angles) in which the laser range finder can perform laser ranging measurements.

Figure 1B:
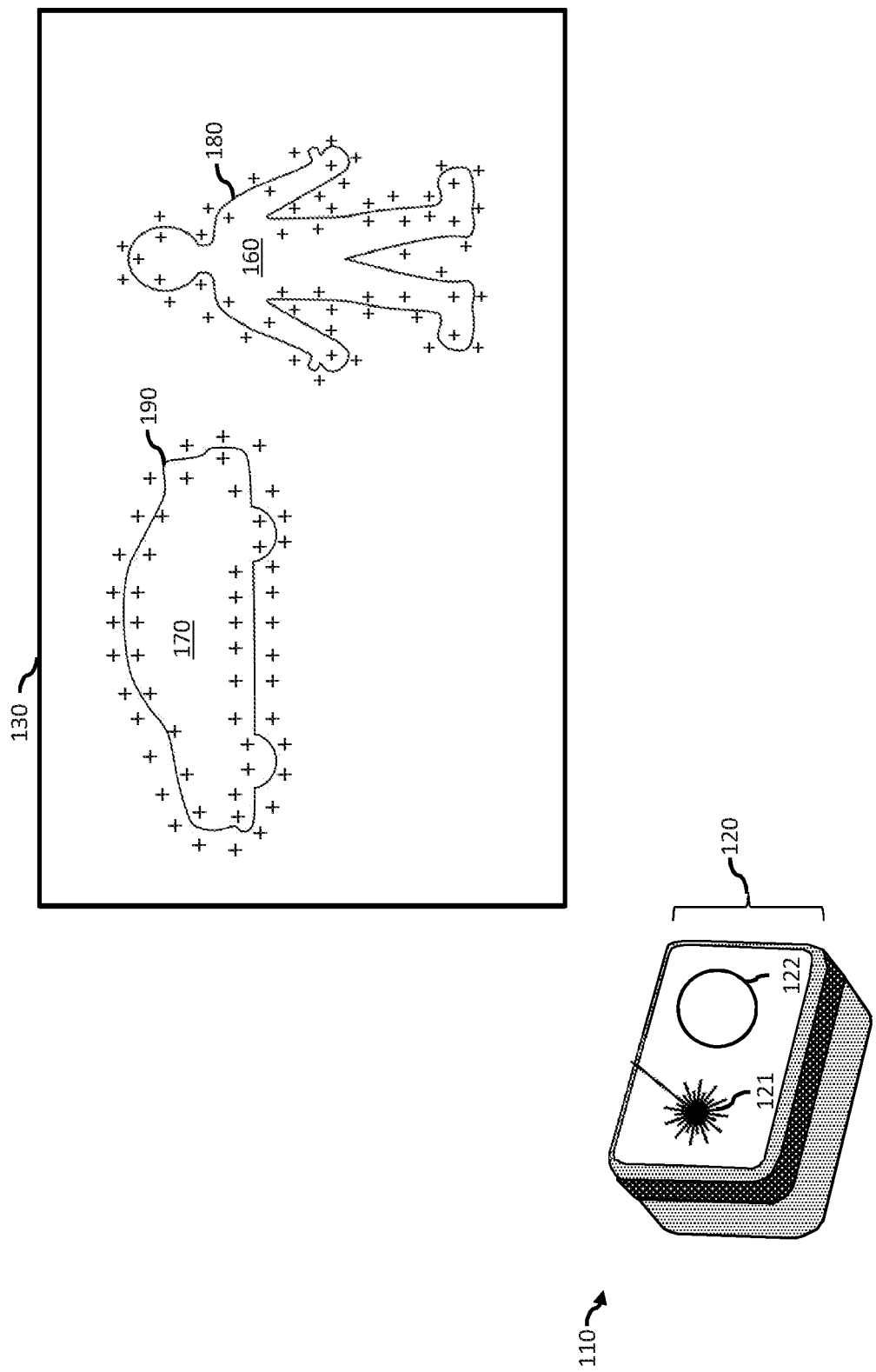

FIG. 1B illustrates a laser range finder 110, with a steerable laser assembly 120 that scans a steerable laser 121 in the same FOV 130 to generate approximately the same number of laser pulses. In the example of FIG. 1B the steerable laser is dynamically steered (instead of uniformly or non-dynamically steered) to generate a non-uniform high laser pulse density pattern surrounding the boundaries 180 and 190 or person 160 and vehicle 170 respectively. Steerable laser assembly 120 is an example of a dynamically-steerable laser assembly and can comprise circuitry to dynamically accept instructions (e.g., laser steering parameters) and configure laser 121 to rapidly change direction or pulse rate of a laser beam. Several embodiments of the present technology provide for using laser steering parameters to dynamically steer, guide, instruct or configure a steerable laser (e.g., an electronically steerable laser) to generate regions of increased laser pulse density or non-uniform pulse density. Laser range finder 110 can further comprise a laser detector 122 to detect reflections from laser pulses.

Figure 2A:
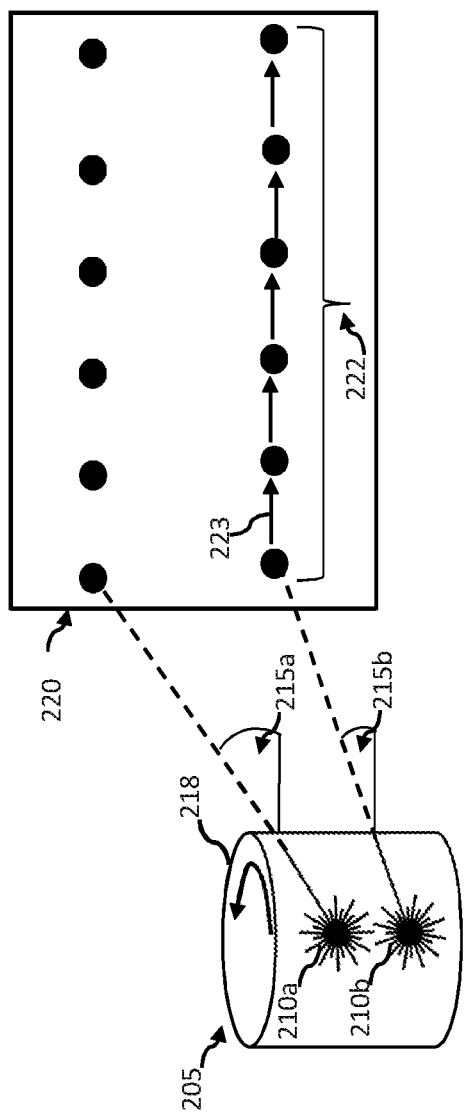
FIG. 2A illustrates a uniformly steered rotating LIDAR generating a sequence of laser pulses in a field of view.

FIG. 2A illustrates some of the features and characteristics of a rotating LIDAR that is not dynamically steered (e.g., the HDL-64e from Velodyne Inc. of Morgan Hill, Calif.). Rotating LIDAR 205 has two lasers 210a and 210b each having a fixed corresponding elevation angle 215a and 215b. The lasers are mechanically rotated in azimuthal direction 218 (i.e., sweeps the azimuthal angle from 0-360 degrees). Lasers 210a and 210b rotate at a constant angular velocity and have a constant pulse rate. Each laser thereby produces a corresponding uniformly spaced sequence of laser pulses (e.g., sequence 222) with a constant elevation angle. The lasers proceed across FOV 220 in a predictable manner with each laser pulse in a sequence having a direction that is separated from the immediately previous laser pulse by a constant angular separation in the azimuthal plane. In particular, the lasers are not reconfigured during each scan to dynamically vary either the angular velocity or the pulse rate. For example, each laser pulse in sequence 222 has a direction that can be can be uniquely defined in spherical coordinates by an elevation angle (sometimes called a polar angle) and an azimuthal angle. In the case of sequence 222 each laser pulse has a constant elevation angle 215b and uniformly spaced azimuthal angles. In the case of FIG. 2A the range of azimuthal angle separations from one laser pulse to the next (e.g., angular separation 223) is single value.

Figure 2B:
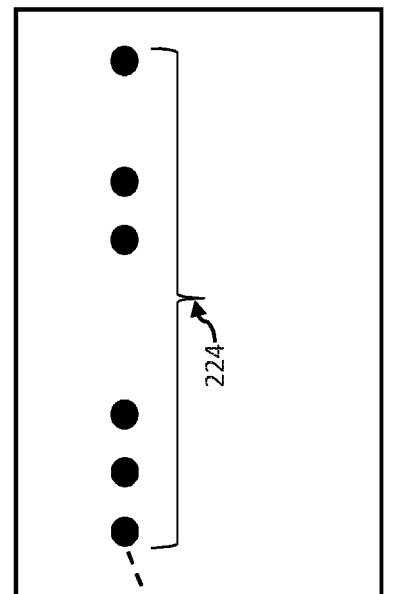

In contrast FIG. 2B illustrates a LIDAR 207 that is dynamically steered by modulating the pulse frequency of a laser while rotating the laser at a constant angular velocity. The result of configuring laser 210a to dynamically modulate the pulse frequency is a sequence of laser pulses 224 with directions in a 1-D range that are separated by varying amounts. In the case of FIG. 2B the direction separations from one laser pulse to the next (e.g., angular separation 223) have a 1-D range and hence LIDAR 207 is dynamically steered in a 1 dimension. The directions in sequence 224 span a 1-D range.

In FIG. 2C an electronically steered LIDAR 230 is dynamically steered by modulating the angular velocity of laser 235 while maintaining a constant pulse rate. The result of configuring the electronically steerable laser to dynamically modulate the angular velocity (or position of the laser in the FOV 236) is a sequence 238 of laser pulses with directions in a 1-dimensional range that are separated by varying amounts. FIG. 2C illustrates dynamically steering a laser including at least three different velocities in the course of a single sweep of the FOV including an initial nominal velocity followed by slowing down the laser trajectory to group pulses more closely and then followed by speeding up the laser to separate laser pulses by more than the nominal separation.

FIG. 2D illustrates dynamically steering a laser in 2 dimensions to generate a sequence of laser pulses that span a 2-D angular range. The resulting sequence has a 2-D angular range from a single laser, in contrast to a rotating LIDAR where each laser generates a sequence with a 1-dimensional angular range. A LIDAR can be configured to dynamically steer a laser to produce sequence 240 by dynamically controlling the angular velocity or position of the laser in 2 dimensions (e.g., both azimuthal and elevation). Such a sequence cannot be performed by a rotating LIDAR due in part to the angular momentum of the rotating components preventing fast modulation of the elevation angle above and below azimuthal plane.

FIG. 2E illustrates dynamically steering a laser to generate a sequence of laser pulses, including several direction reversal during the sequence. For example, laser pulse sequence 242 begins by progressing the laser from left to right across the FOV 244. After laser pulse 245 the laser is reconfigured to reverse the X component of the laser direction from the positive X direction to the negative X direction. After laser pulse 246 the laser is configured to reverse direction again (i.e., back to a positive X direction). In contrast to merely modulating the speed of laser 235 in the positive X direction, direction reversals enable a dynamically steered laser to scan back and forth across a discovered boundary. In addition 2-D dynamic steering combined with direction reversal in the course of a scan of FOV 244 enables laser 235 to dynamically scan along a complex shaped boundary of an object.

FIG. 2F illustrates dynamically steering a steerable laser (e.g., electronically steerable laser 235 in FIG. 2E) to generate a sequence of laser pulses 250 that generate a complex (e.g., spiral) shape. Complex sequence 250 is not possible with a LIDAR that is not dynamically steered (e.g., a LIDAR that that merely rotates around a single axis). One advantage of generating a complex shaped sequence with non-uniform spacing is the ability to arbitrarily determine the order in which portions of the FOV 255 are scanned. For example, sequence 250 may eventually scan a similar region with a similar density as a rotating LIDAR but has the advantage of scanning the outer perimeter first and then gradually progressing towards the center of FOV 255.

Figure 3:
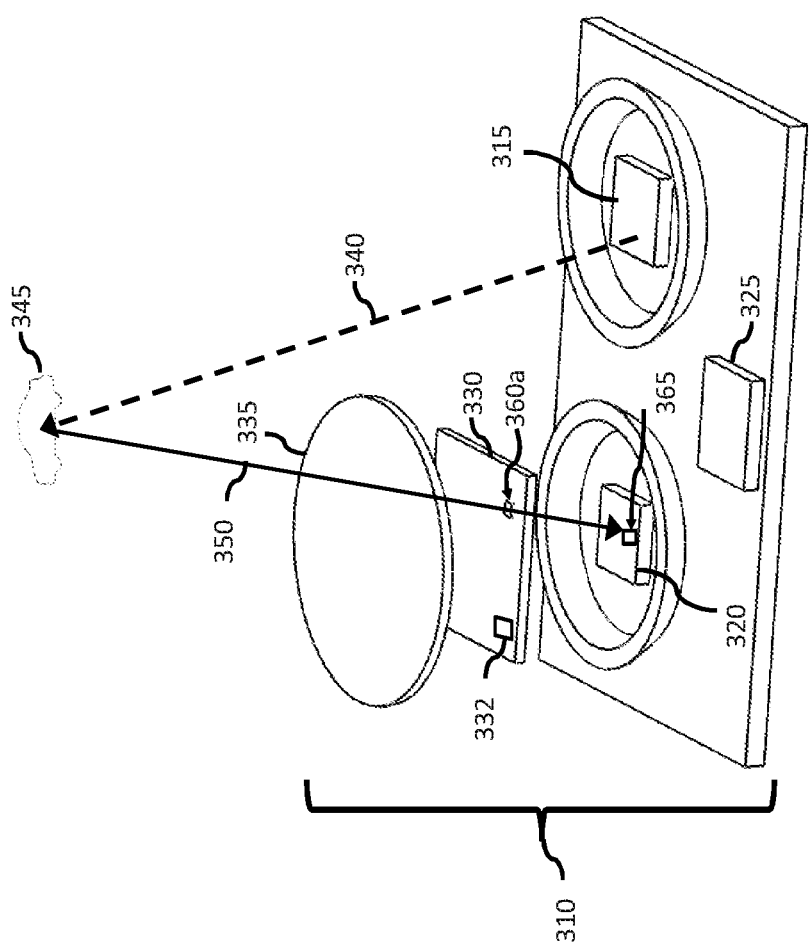
FIG. 3 illustrates several components of a solid state laser range finder, according to an embodiment of the present disclosure.

FIG. 3 illustrates some of the components of a solid-state laser range finder 310 operable to be dynamically steered. Laser range finder 310 can have a steerable laser transmitter 315, such as an optical phased array (OPA). Steerable laser transmitter 315 can comprise a laser generator to generate a set of laser pulses and a laser positioner to transmit the pulses in a set of directions in the field of view of the laser range finder. The laser positioner can comprise a laser splitter, a multimode interference coupler, an optical phase shifter (e.g., linear ohmic heating electrodes) or an out of plane optical coupler to combine the split, phase-shifted beams into an output laser beam pointed in a steerable direction. Laser range finder 310 has a light detector 320 (e.g., a PIN photodiode, avalanche photodiode, a focal plane array or CCD array). The light detector can function to detect reflections (e.g., 350) from the set of laser pulses (e.g., 340) when they interact with objects in the field of view (e.g., vehicle 345). Solid state laser range finder 310 can contain a lens 335 operable to focus laser reflections onto the detector 320. Laser range finder 310 can contain control circuitry 325. Control circuitry 325 can function to receive or generate laser steering parameters indicating how the steerable laser transmitter 315 should be steered (e.g., directions, paths, or regions to scan with the laser). Control circuitry 325 can further function to generate commands or signals to the steerable laser assembly 315 instructing the steerable laser assembly to generate a continuous or pulsed laser beam in a sequence of directions.

Dynamically Steerable Laser Range Finder

Figure 4A:
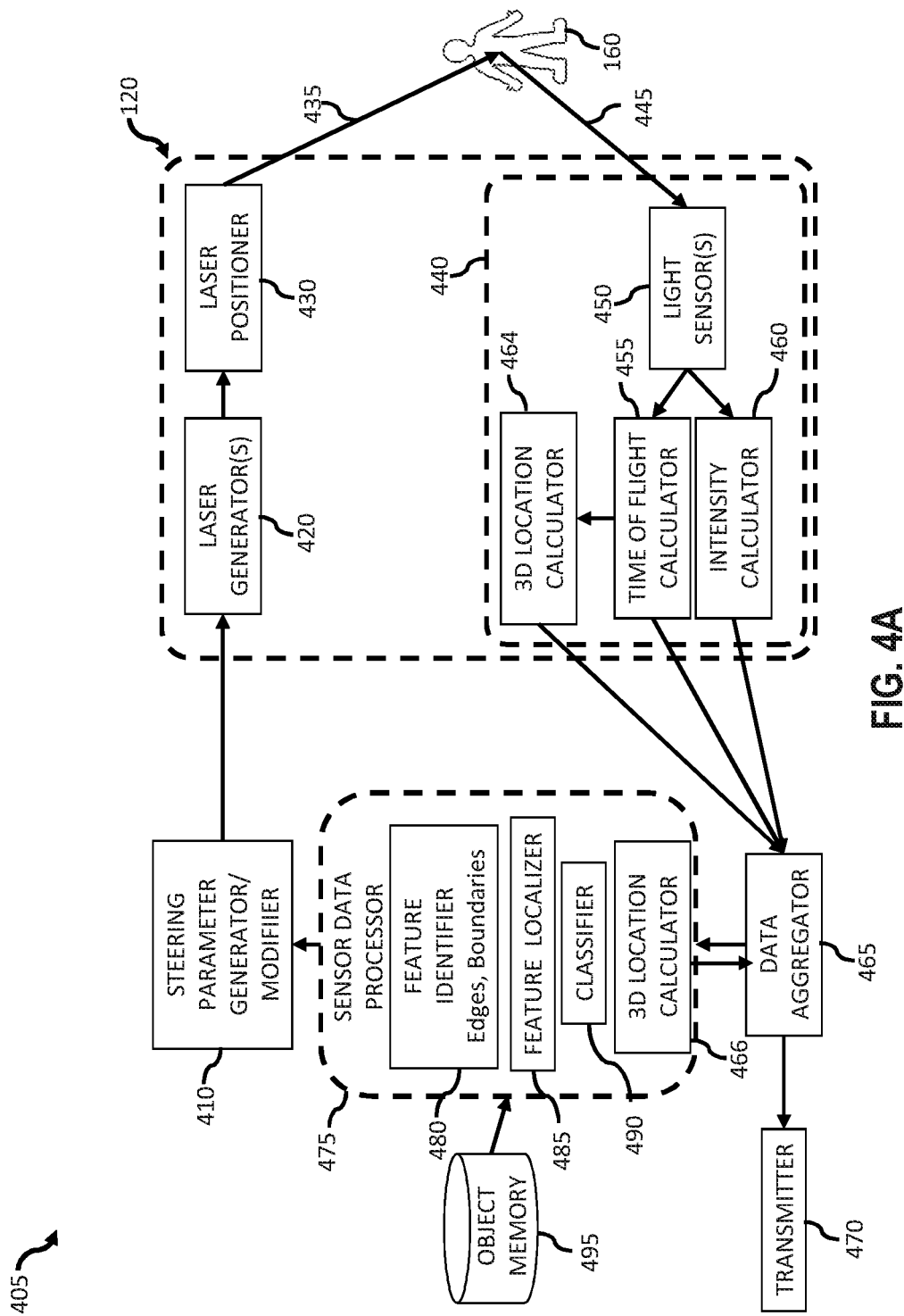
FIGS. 4A and 4B are functional diagrams illustrating several components of an exemplary dynamically steerable laser range finder in accordance with an embodiment of the present disclosure.

FIG. 4A illustrates several components of an exemplary laser range finder 405 operable to be dynamically steered in accordance with an embodiment of this disclosure. Laser range finder 405 can contain a steerable laser assembly 120 or a steerable laser transmitter comprising a laser generator 420 and a laser positioner 430. Laser range finder 405 can contain a laser steering parameter generator 410 to generate laser steering parameters based on processed sensor data from sensor data processor 475. Laser steering parameter generator 200 can function to generate laser steering parameters (e.g., instructions) and transmit the parameters to the steerable laser assembly 120. Laser steering parameter generator 200 can transmit the parameters in a timed manner, such that upon receiving each laser steering parameter the steerable laser assembly 120 executes or reacts to the laser steering parameter. Alternatively, laser steering parameters can be transmitted in a batch or instruction file that is executed over a period of time by the steerable laser assembly 120.

Steerable laser assembly 120 can comprise one or more laser generators 420, a laser positioner 430, and one or more detectors 440. The one or more laser generators 420 can be laser diodes (to produce one or more laser beams (e.g., beam 435) at one or more locations in the FOV determined by the laser positioner 430. Laser positioner 430 functions to steer one or more laser beams (e.g., beam 435) in the FOV based on the laser steering parameters. Laser positioner 430 can mechanically steer a laser beam from laser generator 420. Rotating LIDARs often use a mechanically steered laser positioner. An exemplary mechanically steered laser positioner 430 can include mechanical means such as a stepper motor or an induction motor to move optical components relative to the one or more laser generators. The optical components in an exemplary mechanical laser positioner can include one or more mirrors, gimbals, prisms, lenses and diffraction grating. Acoustic and thermal means have also been used to control the position of the optical elements in the laser positioner 430 relative to the one or more laser generators 420. Laser positioner 430 can also be a solid state laser positioner, having no moving parts and instead steering an incoming laser beam using electronic means to steer the laser beam 435 in an output direction within the FOV. For example, an electronically steerable laser assembly can have a solid state laser positioner comprising a plurality of optical splitters (e.g., Y-branches, directional couplers, or multi-mode interference couplers) to split an incoming laser beam into multiple portions. The portions of the incoming laser beam can then be transmitted to a plurality of delay line where each portion is delayed by a selectable amount (e.g., delaying a portion by a fraction of a wavelength). Alternatively, the delay lines can provide wavelength tuning (e.g., selecting slightly different wavelengths from an incoming laser beam). The variable delayed portions of the incoming laser beam can be combined to form an output laser beam at an angle defined at least in part by the pattern of delays imparted by the plurality of delay lines. The actuation mechanism of the plurality of delay lines can be thermo-optic actuation, electro-optic actuation, electro-absorption actuation, magneto-optic actuation or liquid crystal actuation. Laser positioner 430 and one or more laser generators 420 can be combined onto a chip-scale optical scanning system such as DARPA's Short-range Wide-field-of-view extremely agile electronically steered Photonic Emitter (SWEEPER).

Detector 440 can contain light sensors 450 (e.g., photodiodes, avalanche photodiodes, PIN diodes or charge coupled devices CCDs), signal amplifiers (e.g., operational amplifiers or transconductance amplifiers), a time of flight calculator circuit 455 and an intensity calculator 460. Detector 440 can comprise one or more photodiodes, avalanche photodiode arrays, charge coupled device (CCD) arrays, single photon avalanche detectors (SPADs), streak cameras, amplifiers and lenses to focus and detect reflected laser light from laser beam 435. The construction of the steerable laser assembly 120 can co-locate detector 440 and laser positioner 430 such that detector 440 is pointed in the direction of the outgoing laser beam and can focus the detector on a narrow part of the FOV where the reflected light is anticipated to come from.

The steerable laser assembly 120 of laser range finder 405 can generate a pulsed or continuous laser beam 435. Steerable laser assembly 120 can receive one or more laser reflections 445 corresponding to laser beam 440. Laser range finder 405 can contain a light sensor 450 to detect reflected light from the laser pulses or continuous laser beam.

Steerable laser assembly 120 can contain a time of flight calculator 455 to calculate the time of flight associated with a laser pulse striking an object and returning. The time of flight calculator 455 can also function to compare the phase angle of the reflected laser beam with the phase of the corresponding outgoing laser beam and thereby estimate the time-of-flight. Time of flight calculator 455 can also contain an analog-to-digital converter to detect an analog signal resulting from reflected photons and convert it to a digital signal. Laser range finder 405 can contain an intensity calculator 460 to calculate the intensity of reflected light.

Laser range finder 405 can contain a data aggregator 465 to gather digitized data from time of flight calculator 455 and intensity calculator 460 or 3D location calculator 464. Data aggregator 465 can group data into packets for transmitter 470 or sensor data processor 475. Laser range finder 405 can contain a transmitter 470 to transmit data packets. Transmitter 470 can send the data to a processing subassembly (e.g., a computer or a remote located sensor data processor) for further analysis using a variety of wired or wireless protocols such as Ethernet, RS232 or 802.11.

Laser range finder 405 can contain a sensor data processor 475 to process sensor data and thereby identify features or classifications for some or all of the FOV. For example, data processor 475 can identify features in the FOV such as boundaries and edges of objects using feature identifier 480. Data processor 475 can use feature localizer 485 to determine a region in which the boundaries or edges lie. Similarly a classifier 490 can use patterns of sensor data to determine a classification for an object in the FOV. For example, classifier 490 can use a database of previous objects and characteristic features stored in object memory 495 to classify parts of the data from the reflected pulses as coming from vehicles, pedestrians or buildings. In the embodiment of FIG. 4A sensor data processor 475 is located close to the steerable laser assembly (e.g., in the same enclosure), thereby enabling processing of the sensor data (e.g., reflection ranges) without the need to transmit the reflection data over a wired or wireless link. FIG. 4A is an example of an embedded processing architecture where the latency associated with a long distance communication link (e.g., Ethernet) is avoided when transmitting range data to the sensor data processor.

Figure 4B:
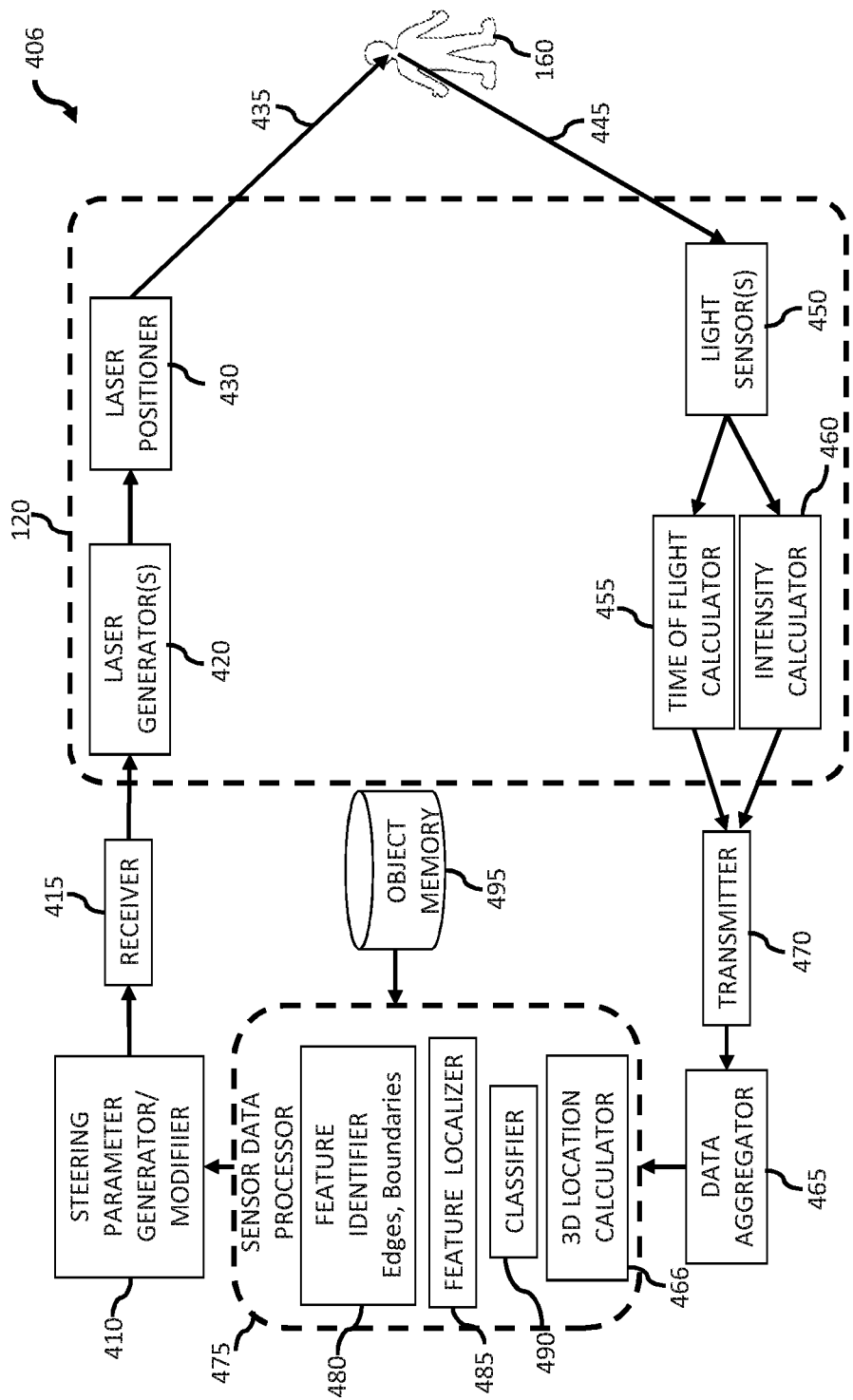

FIG. 4B illustrates several components of a dynamically steered laser range finder system 406 in accordance with an embodiment of this disclosure. In this embodiment the data processing and laser steering parameter generation components are remotely located from the steerable laser assembly 120. Laser range finder 406 can contain a receiver 415 to receive laser steering parameters from the remotely located laser steering parameter generator 410. Receiver 415 can be a wired or wireless receiver and implement a variety of communication protocols such as Ethernet, RS232 or 802.11. Transmitter 470 can transmit data from the time of flight calculator 455 intensity calculators and 3D location calculator 464 (in FIG. 4A) to a remote located data aggregator 465.

FIG. 5A illustrates several components of a laser range finder 510 according to several embodiment of the present disclosure. Laser range finder 510 can contain a processing subassembly 520, a steerable laser assembly subassembly 120 and a communication link 530 for linking the processing and steerable laser assemblies. Processing subassembly 520 can include one or more processors (e.g., sensor data processor 475 in FIGS. 4A and 4B) and one or more transceivers (e.g., a transceiver including receiver 415 and transmitter 470 in FIG. 4B) such as an Ethernet, RS485, fiber optic, Wi-Fi, Bluetooth, CANBUS or USB transceiver. Processing subassembly 520 can also include a computer-readable storage medium (e.g., flash memory or a hard disk drive) operable to store instructions for performing a method to detect and utilize a remote mirror (e.g., a roadside mirror). Steerable laser assembly 120 can include a laser generator 420 and a laser positioner 430 to steer a laser beam at one or more locations in the FOV based on the laser steering parameters. Laser positioner 430 can include one or more optical delay lines, acoustic or thermally based laser steering elements. In a solid state steerable laser assembly, laser positioner 430 can function to receive instructions (e.g., laser steering parameters) and thereby delay portions of a laser beam (i.e., create a phase difference between copies of the laser beam) and then combine the portions of the laser beam to form an output beam positioned in a direction in the FOV. A mechanical laser positioner 430 can be a mirror and mirror positioning components operable to receive input signals (e.g., PWM input to a steeper motor) based on laser steering parameters and thereby steer the mirror to position a laser in a direction in the FOV. Steerable laser subassembly 120 can also include a detector 440 comprising components such as light sensor(s) 450, time of flight calculator 455 and light intensity calculator 460 and 3D location calculator. Steerable laser subassembly 120 can include one or more transceivers (e.g., receivers 415 and transmitters 470 in FIG. 4B) such as Ethernet, RS485, fiber optic, Wi-Fi, Bluetooth, CANBUS, or USB transceivers. Communication link 530 can be a wired link (e.g., an Ethernet, USB or fiber optic cable) or a wireless link (e.g., a pair of Bluetooth transceivers). Communication link 530 can transfer laser steering parameters or equivalent instructions from the processing subassembly 520 to the steerable laser assembly 120. Communication link 530 can transfer ranging data from the steerable laser assembly to the processing subassembly 520.

When operable linked to steerable laser assembly 120 the processing subassembly 520 can perform one or more embodiments of the method to find, utilize and correct for a remote mirror in the FOV of laser range finder 510.

FIG. 5B illustrates exemplary laser steering parameters 501 according to aspects of the technology. Laser steering parameters can be instructions operable to steer a laser beam with a steerable laser assembly in a FOV or steer a controllable magnifier. For example, in an electronically scanned laser range finder (e.g., model S3 from Quanergy Inc. of Sunnyvale, Calif.) a set of laser steering parameters can define aspects of the output laser beam such as the direction, pulse duration, intensity and spot size. Laser steering parameters can function to instruct the laser generator 420 in FIG. 4A to define aspects such as laser spot size, intensity and pulse duration. Laser steering parameters can instruct laser positioner 430 in FIG. 4A how to delay portions of the laser beam and combine the delayed portions to define the direction of the output laser beam. A mechanically steered LIDAR can perform dynamic steering by using laser steering parameters to dynamically position the laser in the FOV or to dynamically position a mirror to reflect the laser beam in a desired direction. Laser steering parameters can be operable to instruct a steerable laser assembly to steer a laser beam and can be transmitted to the steerable laser assembly as a file. Alternatively laser steering parameters can be stored in a file and can be sequentially processed and used to generate electrical signals operable to generate and guide a laser beam. For example, laser steering parameters can be similar to the parts of a stereolithography (.STL) file. STL files are commonly used as instruction sets to position extruder heads and cutting heads in 3D printers, cutting tools and laser stereolithography. A set of laser steering parameters 501 can include a start location 502 indicating where one or more other laser steering parameters should be applied. Start location 502 can be a point in a Cartesian coordinate system with an associated unit of measure (e.g., 20 mm to the right and 20 mm above the lower right corner of the lower left corner of the field of view). In several laser range finders the FOV is described in terms of angular position relative to an origin in the FOV. For example, a starting point could be +30 degrees in the horizontal direction and +10 degrees in the vertical direction, thereby indicating a point in the FOV.

A laser steering parameter can be a region width 504 or a region height 506. The width and height can be expressed in degrees within the FOV. One exemplary set of laser steering parameters could include a start location, region width and region height thereby defining a four sided region in the FOV. Other laser steering parameters in the exemplary set of laser steering parameters can indicate how to tailor a scan within this region, such as laser scan speed 514, laser pulse size 516 or number of laser pulses 518.

A laser steering parameter can be one or more region boundaries 508 defining the bounds of a region. A laser steering parameter can be one or more laser pulse locations 511. Pulse locations 511 can provide instructions to a steerable laser to move to corresponding positions in the FOV and generate on or more laser pulses. In some embodiments the laser can be generating a laser beam while being steered from one location to another and can dwell for some time at the laser pulse locations. In other embodiments the steerable laser can use these points 511 to generate discrete pulses at defined locations. In such embodiments the laser beam can be generated at discrete pulse locations and can dwell at the pulse location for some time.

A laser steering parameter can be one or more path waypoints 512, which define points in a FOV where a steerable laser can traverse or points at which the steerable laser can implement direction changes. FIG. 5C illustrates two exemplary paths 540 and 550 that can be defined by path waypoints (e.g., waypoints 512) and used to instruct a steerable laser. It would be obvious to a person of skill in the art that several laser steering parameters can produce equivalent or nearly equivalent regions of non-uniform pulse density. For example, selecting various combinations of laser steering parameters such as combinations of paths 540 and 550 to produce similar regions of increased or non-uniform laser pulse density.

Figure 6:
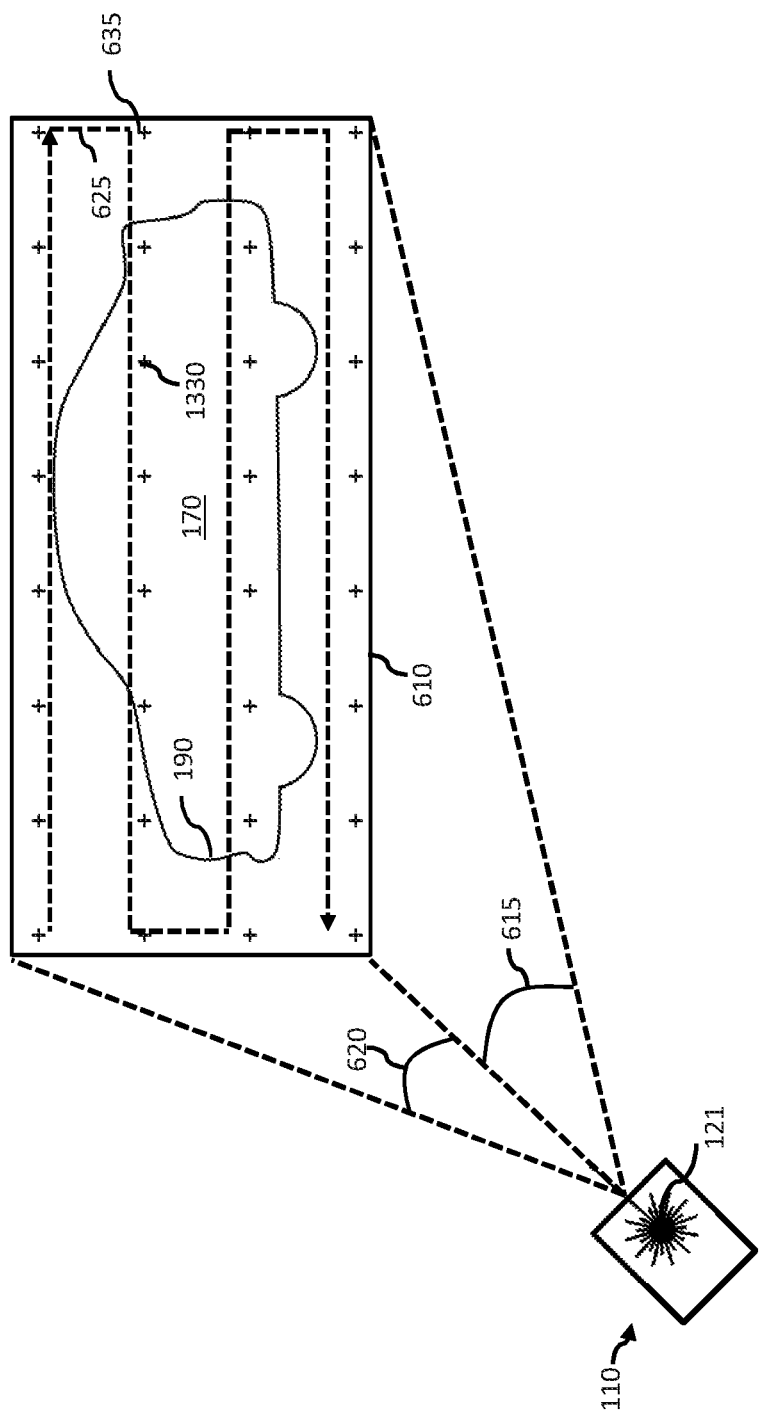
FIG. 6 illustrates several aspects of a progressive boundary localization method.

Turning to FIG. 6 in one embodiment of a PBL method a laser range finder 605 can comprise one or more a dynamically steerable lasers (e.g., laser 121) that can scan a FOV 610 comprising an azimuthal angular range 615 and an elevation angular range 620. The dynamically steerable laser 121 can receive and process a plurality of laser steering parameters to sweep a laser beam through a plurality of orientations, illustrated by path 625 in FOV 610. While sweep path 625 steerable laser 121 can generate a sequence or set of laser pulses each with a corresponding direction illustrated by "+" symbols in FIG. 6. Some of the laser pulses (e.g., pulse 630) can intersect with objects (e.g., vehicle 100, indicated by boundary 120). Other pulses (e.g., pulse 635) may not intersect with the vehicle.

Figure 7A:
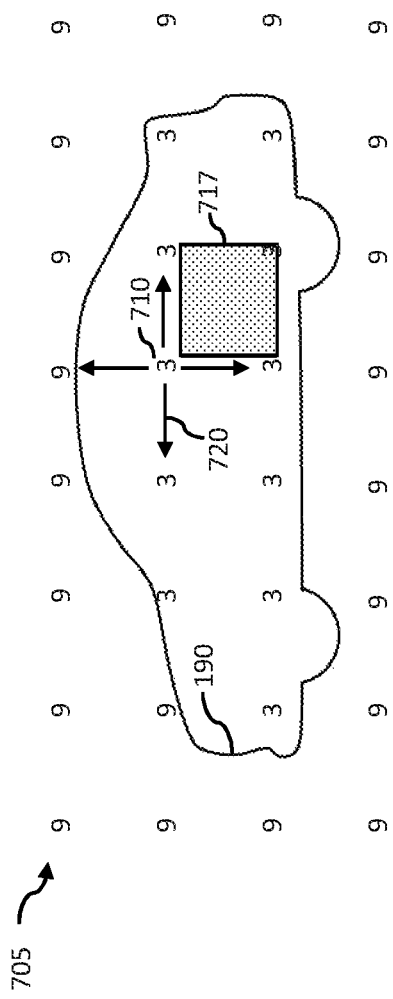
FIGS. 7A and 7B illustrate several aspects of a progressive boundary localization method.

Turning to FIG. 7A, the laser range finder can receive a set of laser reflections corresponding to the sequence of laser pulses and can measure for each laser pulse in the sequence of laser pulses a corresponding direction and a corresponding time of flight (e.g., 100 nS) or range (e.g., 30 m). The set of TOFs and set of directions corresponding to the sequence of laser pulses is illustrated as data matrix 705. Data matrix 705 can also be stored as a list of directions and corresponding TOFs for each laser pulse in the sequence of laser pulses. For the purpose of illustration laser reflections from vehicle 100 have a TOF of 3 and laser reflections from outside the boundary 120 of vehicle 100 have a TOF of 9. A challenge is to identify the location of boundary 120 from data matrix 705. One approach is to identify nearest neighbors for each laser reflection and to identify if a TOF boundary lies between the nearest neighbor pairs. Each laser pulse (e.g., the laser pulse illustrated by data point 710) can have a plurality of nearest neighbors in a plurality of directions or a plurality of ranges of directions (e.g., direction 715 and 720).

Figure 7B:
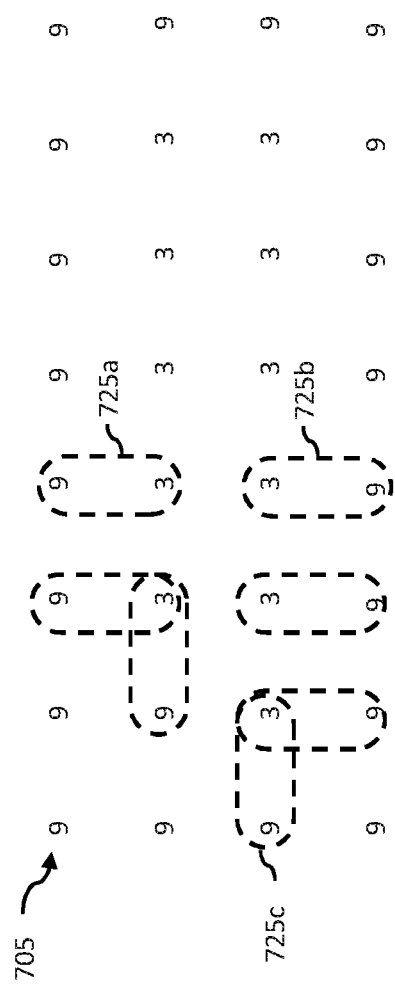

Turning to FIG. 7B several pairs of laser pulses (e.g., pairs 724*a-c*) can be identified such that the difference in the TOF between laser pulses in each pair is greater than a threshold value. For example, pair 725*a* contains a first laser pulse within the vehicle perimeter with a TOF of 3 and a second laser pulse outside the vehicle perimeter with a TOF of 9. The difference in the TOF values can be greater than a TOF threshold of 5, thereby indicating the presence of a TOF boundary (e.g., the edge of a vehicle) in the angular range between the directions associated with each of the laser pulses in each pair.

Figure 8:
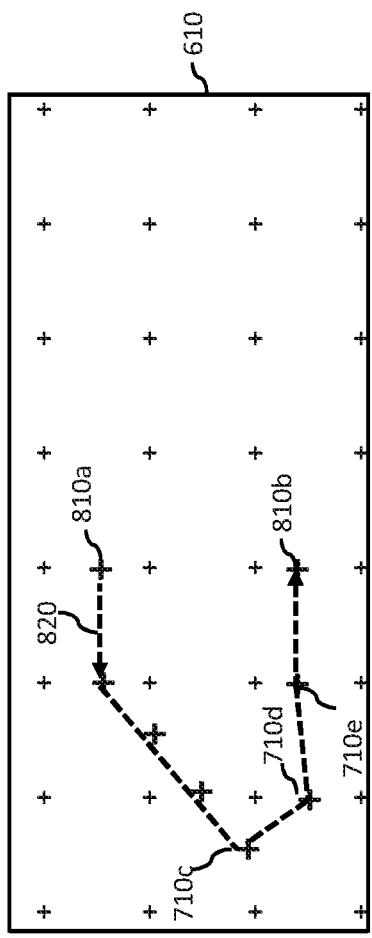
FIG. 8 illustrates several aspects of a progressive boundary localization method.

FIG. 8 illustrates the original FOV 610 and the original sequence of laser pulses. In response to identifying the pairs for which the TOF difference is greater than a threshold value (e.g., pairs 725*a-c* in FIG. 7B), one or more second laser steering parameters can be dynamically generated to steer the steerable laser along a path 820 that generates additional laser pulses in the intervening spaces corresponding to each of the pairs. For example, laser pulses 810*a-b* can be generated as the steerable laser moves along path 820. Path 820 can be a complex shape (e.g., roughly outlining the boundary 120 of vehicle 100). In one aspect, the second set of laser steering parameters to generate path 820 can vary two angular velocities simultaneously between neighboring laser pulses 810*d* and 810*e*. In another aspect, path 820 can cause the steerable laser to change direction from a negative azimuthal angular velocity before laser pulse 810*c* to a positive azimuthal angular velocity after laser pulse 810*c*. The PBL method enables the intervening laser pulses 810*a-e* to be located in parts of the FOV 610 estimated to contain an object boundary (i.e., that have TOF differences greater than the TOF threshold.

The direction of each of the intervening pulses 810*a-e* is indicated by the 2-D location in the FOV 610. The direction of intervening pulse 810*a* can be based one or more of the directions of the corresponding pair of laser pulses 725*a*. For example, path 820 can be designed to place pulse 810*a* midway between the laser pulses in pair 725*a*. Path 820 can place intervening pulses 810*a-e* at specified angular direction relative to one of the pulses in each of the pairs of laser pulses with TOF difference. For example, the first sequence of laser pulses produced by steering the LIDAR 605 along path 625 in FIG. 6 can have an angular spacing of 1 degree in elevation and 1 degree azimuthal. Intervening laser pulses 810*a-e* can be placed in a direction in the FOV 610 with a separation of 0.3-0.5 degrees from one of the laser pulse directions in the corresponding pairs of laser pulses. The intervening laser pulses 810*a-e* can be located a defined angular separation from a first pulse in a corresponding laser pulse pair and in a direction towards the second laser pulse in the pair, thereby ensuring that each intervening laser pulse destroys the nearest neighbor relationship of the corresponding laser pulse pair (e.g., 725*a* in FIG. 7B). In this way nearest neighbor pairs 725*a-c* with a TOF difference greater than a TOF threshold may no longer be nearest neighbor pairs when the intervening laser pulses are generated.

Intervening laser pulses (e.g., pulses 810*a-b*) can be added to the sequence of laser pulses. In one aspect intervening laser pulse 810*a* causes laser pulse pair 725*a* in FIG. 7B to no longer be a nearest neighbor pair. Therefore, as intervening laser pulses are added to the sequence of laser pulses the nearest neighbor pairs can be modified by new intermediate laser pulses.

Figure 9:
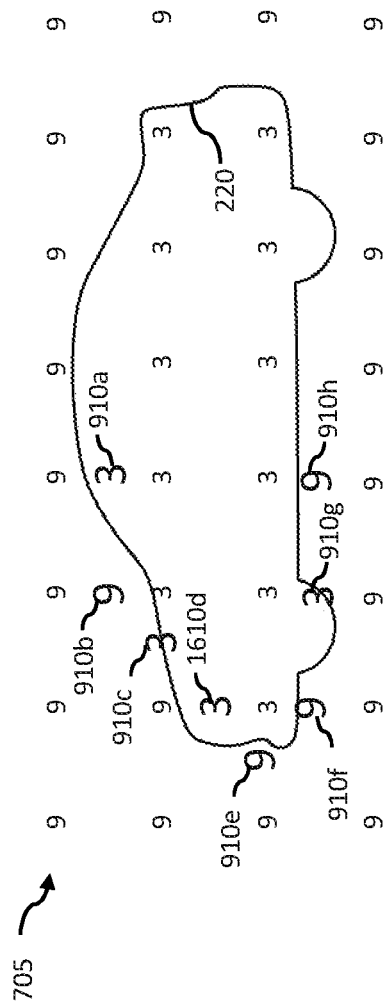
FIG. 9 illustrates several aspects of a progressive boundary localization method.

Turning to FIG. 9 the laser range finding system can calculate a TOF 910*a-h* for each of the intervening laser pulses. FIG. 10A-F illustrates an embodiment of a PBL method wherein a LIDAR scans a FOV and generates a sequence of range measurements that progressively localize time-of-flight boundaries. In the embodiment of FIG. 10A-F nearest neighbor pairs of laser pulses are identified in a sequence of laser pulses, such that the TOF difference between pulses in each nearest neighbor pair is greater than a TOF threshold and then iteratively adding intervening laser pulses with directions that destroy the nearest neighbor relationship of the corresponding laser pulse pairs. The LIDAR can dynamically steer and generate intervening laser pulses, thereby refining the location of the TOF boundary, until each nearest neighbor pair with a TOF difference greater than the TOF threshold are separated by less than a threshold distance (e.g., a direction difference less than 0.5 degrees).

Figure 10:
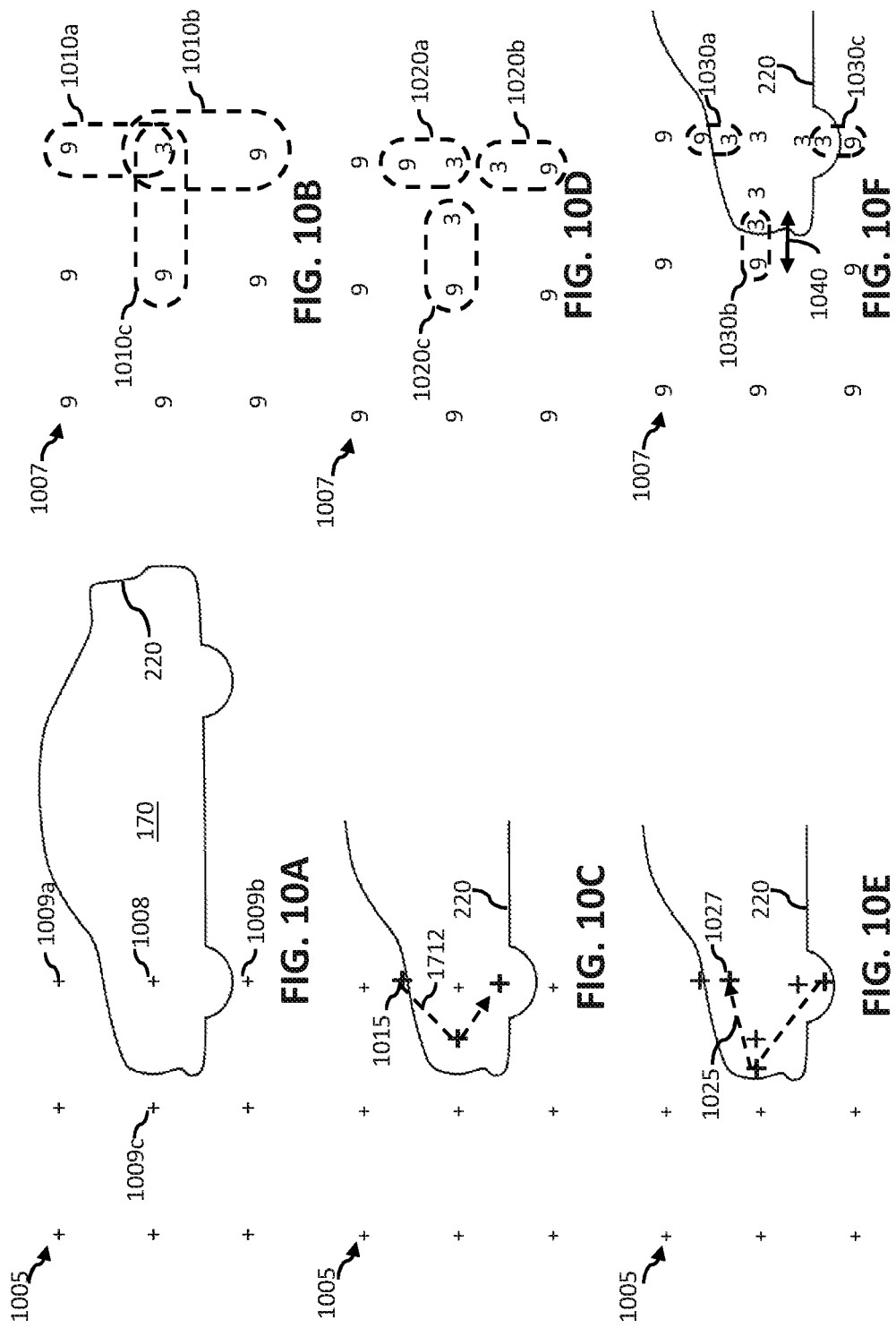
FIGS. 10A, 10B, 10C, 10D, 10E and 10F illustrate several aspects of a progressive boundary localization method.

In FIG. 10A, a laser range finding system can scan a 2-D (elevation, azimuthal) range of orientations while generating a sequence of laser pulses 1005. In FIG. 10B the laser range finder system can receive a sequence of laser reflections 1007 corresponding to the sequence of laser pulses 1005 and can measure or calculate a direction and TOF corresponding to each of the outgoing sequence of laser pulses. The laser range finder system can identify one or more of the sequence of laser pulses (e.g., pulse 1009 in FIG. 10A) for which the difference in TOF to a nearest neighbor pulse is greater than a threshold value. For example, the TOF difference between laser pulse 1008, within the vehicle 100 and nearest neighbor pulses 1009a-c outside the vehicle perimeter can be greater than a threshold (e.g., a TOF threshold of 5). FIG. 10B illustrates three pairs 1010a-c of laser reflections for which the TOF difference (i.e., the difference between a first TOF in the pair and a second TOF from the pair) is greater than a threshold.

In FIG. 10C the laser range finder system can generate a set of laser steering parameters and use these to guide the system along a path 1012 to generate intervening laser pulses e.g., 1015. The intervening laser pulses and path 1012 can have directions in the FOV based on one or more of the laser pulses in the pairs of laser pulses 1010a-c. In FIG. 10D time of flight data can be measured for the intervening laser pulses and they can be added to the sequence of laser pulses 1005. A TOF test can again be performed that identifies those nearest neighbor pairs of laser pulses for which the TOF difference is greater than a TOF threshold. The TOF threshold can be modified each time the TOF test is performed in order to localize iteratively smaller TOF differences. In FIG. 10D three new pairs of laser pulses 1020a-c are generated that fail the TOF test (i.e., have TOF differences greater than a TOF threshold). In one aspect of several embodiments the location of the intervening pulses can be seen to prevent the original laser pulse pairs 1010a-c from reoccurring during subsequent applications of the TOF test, thereby ensuring that the boundary (e.g., boundary 120 in FIG. 10A) is localized to a smaller area in successive iterations of the TOF test. In FIG. 10E the laser range finder system uses the identified pairs of laser pulses to generate a new path 1025 with more intervening laser pulses (e.g., 1027). FIG. 10F illustrates that the TOF test can be applied again to identify pairs of nearest neighbor laser pulses (1730a-c) between which the TOF boundary 120 lies. The TOF test can be applied until each pair of nearest neighbor pulses that fails the TOF test has an angular separation e.g., 1040 less than a threshold separation or distance (e.g., an angular separation between points in each pair of less than 0.5 degrees).

In several embodiments, a LIDAR can apply a boundary localization test to each point in an existing set of laser pulses with corresponding directions and TOF values. The localization test can define several angular ranges. Consider that laser reflection 710 in FIG. 7A can be located at 0 degrees elevation and 0 degrees azimuth. An angular range can be all negative elevation angles along direction 715. An exemplary 2-D angular range relative to point 710 can be elevation angles with a range 0-1 degree and azimuthal angles in a range 0-1 degree, thereby defining a box 717. The localization test can identify for each laser pulse whether there exists a nearest neighbor for each of the angular ranges for which the TOF difference is greater than a TOF threshold and for which the angular separation (e.g., the square root of the sum of the squares of the angular separations along each of the elevation and azimuthal axes) is greater than a threshold separation. When such a nearest neighbor exists the laser pulses in the sequence fails the localization test and the PBL method places an intervening laser pulses in the region between the laser pulses and the nearest neighbor and adds the intervening laser pulse to the sequence thereby destroying the nearest neighbor relationship between the laser pulses and the original nearest neighbor. In one aspect a PBL method, immediately after generating an intervening laser pulse a LIDAR can apply the localization test to the new intervening laser pulse. In this way a LIDAR can iteratively localize a TOF boundary, such that all pairs of laser pulses between which the TOF boundary lie are separated by no more than a threshold angular separation.

Figure 11:
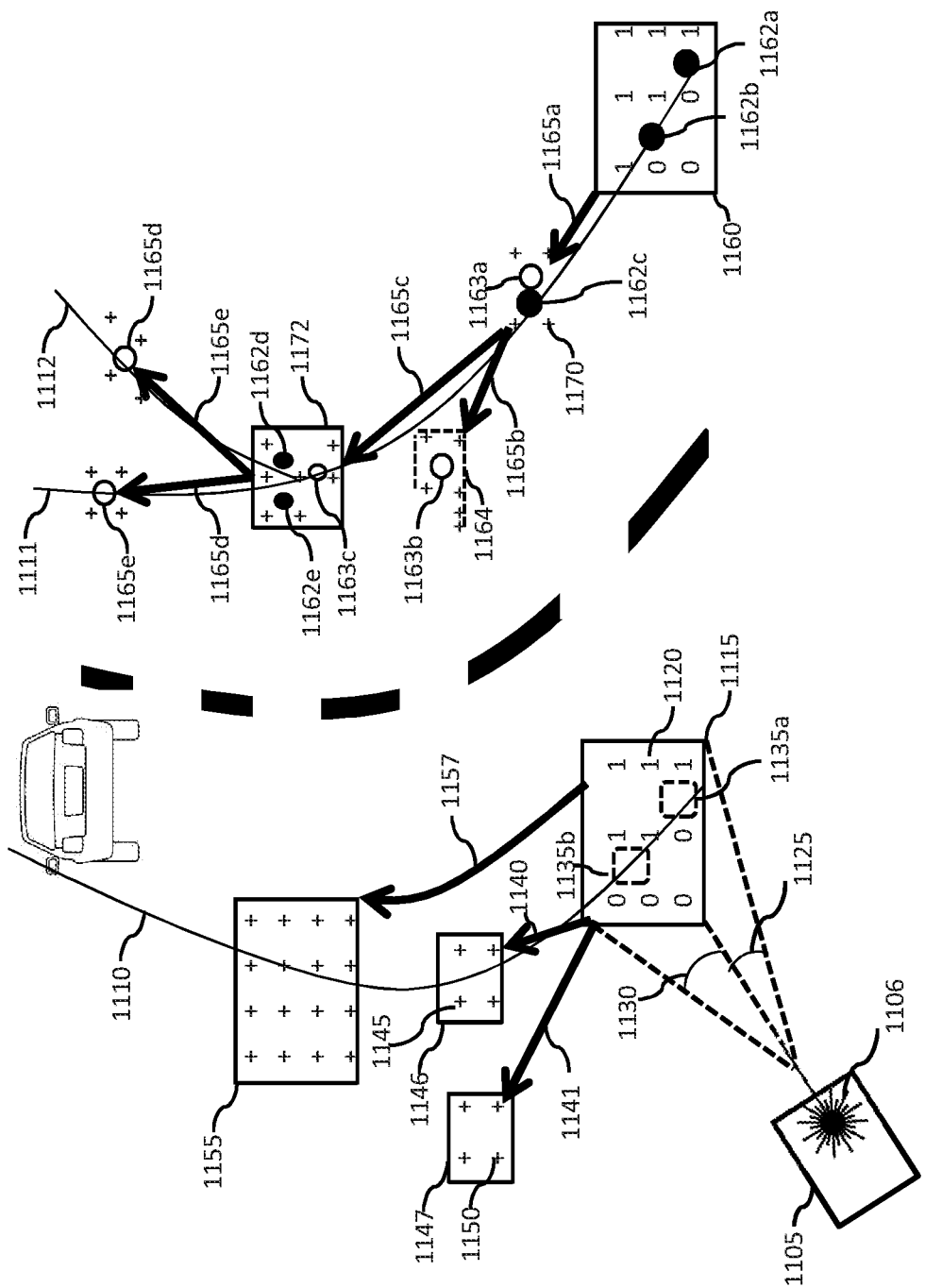
FIG. 11 illustrates several aspects of an extrapolation-based progressive boundary localization method.

FIG. 11 illustrates a PBL method wherein a LIDAR identifies a first portion of a TOF boundary in a FOV and estimates a direction (i.e., an angular offset in the FOV) to reach a search zone (e.g., an angular range) wherein the LIDAR searches for a second portion of the TOF boundary.

Several embodiments of FIG. 11 can be considered extrapolation-based progressive boundary localization (EPBL) methods. Using EPBL one or more locations on a TOF boundary identified by a LIDAR in a first search region within a FOV can be used to extrapolate or predict an estimated boundary location outside of the first search region. The LIDAR can then dynamically steer to generate a second search region based on the estimated boundary location. The extrapolation of the estimated boundary location can be based on the shape of a line through the one or more locations identified on the boundary (e.g., a straight line fit through two locations or a curve fitted through 3 or more locations). In other embodiments the extrapolation of a predicted or estimate boundary location outside the first search region can be based on a classification of the type of boundary. For example, many objects that a LIDAR on an autonomous vehicle can encounter have common shape characteristics within various object classifications such as common road intersection patterns, trucks shapes, overpasses, pedestrians, cyclists or buildings. An extrapolation of an estimated boundary location can be based on processing one or more known boundary locations in the context of one or more predicted object classifications. For example, a newly discovered TOF boundary may be one or many object types (e.g., a tree or a pedestrian at the corner of a road intersection). An exemplary EPBL embodiment could apply a 50% probability that the boundary is the trunk of a tree and a 50% probability that the boundary is the body of a person and estimate a boundary location outside a first search region based on the blended classification and the one or more known boundary locations. Subsequent search regions generated based on the estimated boundary location can cause the predicted classification to favor either the tree or the person and future extrapolation of estimated boundary locations can be weighted according to the set of known boundary locations and the updated classification weightings.

Various embodiments provide for calculating a confidence value or standard deviation associated with the direction (i.e., the angular offset to reach a new search zone defined by an estimated boundary location or vector). For example, everyday objects can have boundaries or edges with simple shapes (straight lines or simple curves) arranged in a direction relative to an observation point. Hence while it may be impractical for a rotating LIDAR to try to dynamically track and scan the boundary of object at an arbitrary orientation, it may be more practical to use a dynamically steerable LIDAR. In comparison to a steerable RADAR that tracks an objects movement from one scan to another and can predict a direction for the object, the disclosed PBL method can estimate the edges of an object within a single scan by finding a first portion of an edge and predict a direction for the edge (based on curve fitting, object classification or extrapolation). The method can then scan a laser beam in a pattern at a second location some distance along the predicted direction of the boundary in the FOV. Turning to FIG. 11 a LIDAR 1105 can scan a dynamically steerable laser 1106 in a first 2-D angular range 1115 (e.g., defined by an elevation angular range 1130 and a azimuthal angular range 1125). The total FOV of LIDAR 1105 can include several boundaries such as road edges 1110, 1111 and 1112. LIDAR 1105 can scan a path that comprises a sequence of orientations in the 2-D angular range. While scanning the path LIDAR 1105 can generate a sequence of laser pulses and measure a corresponding sequence of laser reflections. LIDAR 1105 can calculate a TOF (e.g., TOF 1120) or a distance corresponding with each of the sequence of outgoing laser pulses. The TOF values can have differences that indicate approximate location of a first portion of boundary 1110. For example, the TOF values (e.g., TOF 1120) can indicate angular regions 1135a-b that encompass a part of the boundary 1110. In one embodiment the LIDAR 1105 can calculate one or more regions in angular range 1115 that intersects the boundary. In other embodiments LIDAR 1105 can calculate one or more location estimates for points on the boundary 1110. For example, the PBL method can estimate that points on boundary 1110 are located midway between nearest neighbor points that indicate they are on opposite sides to the TOF boundary based on a TOF difference. One or more first locations or regions on the boundary 1110 can be used by the LIDAR to calculate a vector 1140 or 1141 used to steer the LIDAR 1105 to a second region estimated to overlap a second portion of boundary 1110. Shift vector 1140 can be a 2-D direction shift (e.g., a 10 degree elevation angle shift and a −10 degree azimuthal angle shift) to change the orientation of steerable laser 1106 from the first angular range 1115 to a second angular range 1146. In one aspect a shift vector 1141 can point to a search region 1147 that does not span the boundary 1110. In this case, in response to identifying that a search region (e.g., region 1147 including laser pulse 1150) does not contain a boundary, a new larger search region 1155 can be defined in an effort to reacquire the boundary 1110. One advantage of the EPBL method of FIG. 11 is that a second search region need not surround or adjoin a first search region. Instead a first search region can identify a direction of a TOF boundary. The direction can be used to generate a vector 1140 (i.e., a 1-D or 2-D angular shift) that functions to shift LIDAR 1105 to a new search location. In a related embodiment several locations on a first portion of a boundary calculated from a first search area can be used to interpolate a shape and direction of a boundary (e.g., a line or a curve). For example, three locations identified on a boundary 1110 from a first sequence of laser pulses including laser pulse 1120 can be used to define a curve or an arc 1157 on which other portions of the boundary 1110 are expected to lie.

In a related embodiment, a LIDAR can scan a path including a sequence of orientations in a first 2-D search region 1160 of a FOV. While scanning the path, the LIDAR can generate a plurality of laser pulses, receive a corresponding sequence of laser reflections and calculate a TOF corresponding to each of the outgoing laser pulses. The LIDAR can identify the presence of a TOF boundary (e.g., the edge of a vehicle or the edge 1111 of a roadway), by identifying one or more nearest neighbor pairs of laser reflections for which the TOF difference is greater than a TOF threshold. The LIDAR can calculate a set of boundary locations (e.g., locations 1162a and 1162b) based on the TOF measurements from the first search region 1160. The LIDAR can process one or more locations in the set of boundary locations (e.g., locations 1162a and 1162b) to predict an estimated boundary location 1163a, located outside the first search region. The LIDAR can generate a set of laser steering parameters, based on the estimated boundary location and dynamically steer a laser 1106 based on the laser steering parameters to generate a second plurality of laser pulses (e.g., including laser pulse 1170) in a second search region. In this way a LIDAR scan can be guided by identifying and adding directions in a FOV (e.g., locations in a FOV) that lie on a TOF boundary, predicting and estimated boundary location outside a first search region and scanning a second search regions with laser pulses based on the predicted trajectory of the TOF boundary. The method can be performed iteratively in the course of a single scan by building up a set of confirmed boundary locations, predicting estimated boundary locations and scanning a second search region around the estimated boundary location. In one embodiment of an EPBL method illustrate in FIG. 11, a first search region 1160 is used to generate boundary locations 1162a-b, that are then used to extrapolate the estimate boundary location 1163a or vector 1165a pointing to a second search region. A LIDAR scans a second search region to identify another boundary location 1162c that is added to the set of boundary locations. The updated set of boundary locations can be used to extrapolate a new estimated boundary location 1163b or an associated vector 1165b leading to a third search region that can be defined by path 1164. Path 1164 can have a complex shape involving a number of right angle turns or direction reversals with the FOV, thereby requiring dynamic steering of the LIDAR. In FIG. 11 the third search region (e.g., defined by path 1164) does not intersect or contain the TOF boundary 1111. For example, all laser pulses along path 1164 can have reflections that indicate a common TOF associated with one or other side of boundary 1111. In one aspect, in response to identifying that a search region does not contain a boundary location (i.e., does not intersect a TOF boundary) an EPBL method can generate a new estimated boundary location 1163c and dynamically steer a laser 1106 to generate a new search region 1172. The new search region 1172 can have a wider angular range designed to reacquire the boundary location surrounding the new estimated boundary location 1163c. The new estimated boundary location 1163c can be based on one, some or all of the locations in the set of boundary locations as well as the estimated boundary location 1163b that failed to generate a new boundary location. Search region 1172 can yield reflections that indicate a divergence or splitting of a TOF boundary. Such TOF boundary splitting can occur where objects overlap in the FOV of the LIDAR 1105. Consider that many common objects that a vehicle-based LIDAR may encounter can comprise a series of intersecting straight-line or curved boundaries, such as the intersecting architectural lines of an overpass or a freeway exit. In response to identifying two intersecting or diverging boundaries in a search region 1172 (e.g., indicated by boundary locations 1162d and 1162e), the LIDAR can generate distinct estimated boundary locations 1163d and 1163e (or vectors 1165d and 1165e) for multiple distinct TOF boundaries 1111 and 1112.

In another embodiment of a EPBL method a LIDAR 1105 can track several TOF boundaries 1110 and 1111 simultaneously, by several distinct sets of boundary locations and periodically generating a new search regions for each based on a new extrapolated estimated boundary location. An EPBL method that tracks several boundaries at once can perform different functions in parallel such as extrapolating an estimated boundary location for a first boundary while scanning a new search region for a second boundary. Similarly an EPBL method can perform a wide angle 2-D scan of a FOV to search for new TOF boundaries while extrapolating boundary locations and tracking one or more previously discovered boundaries.

Figure 12:
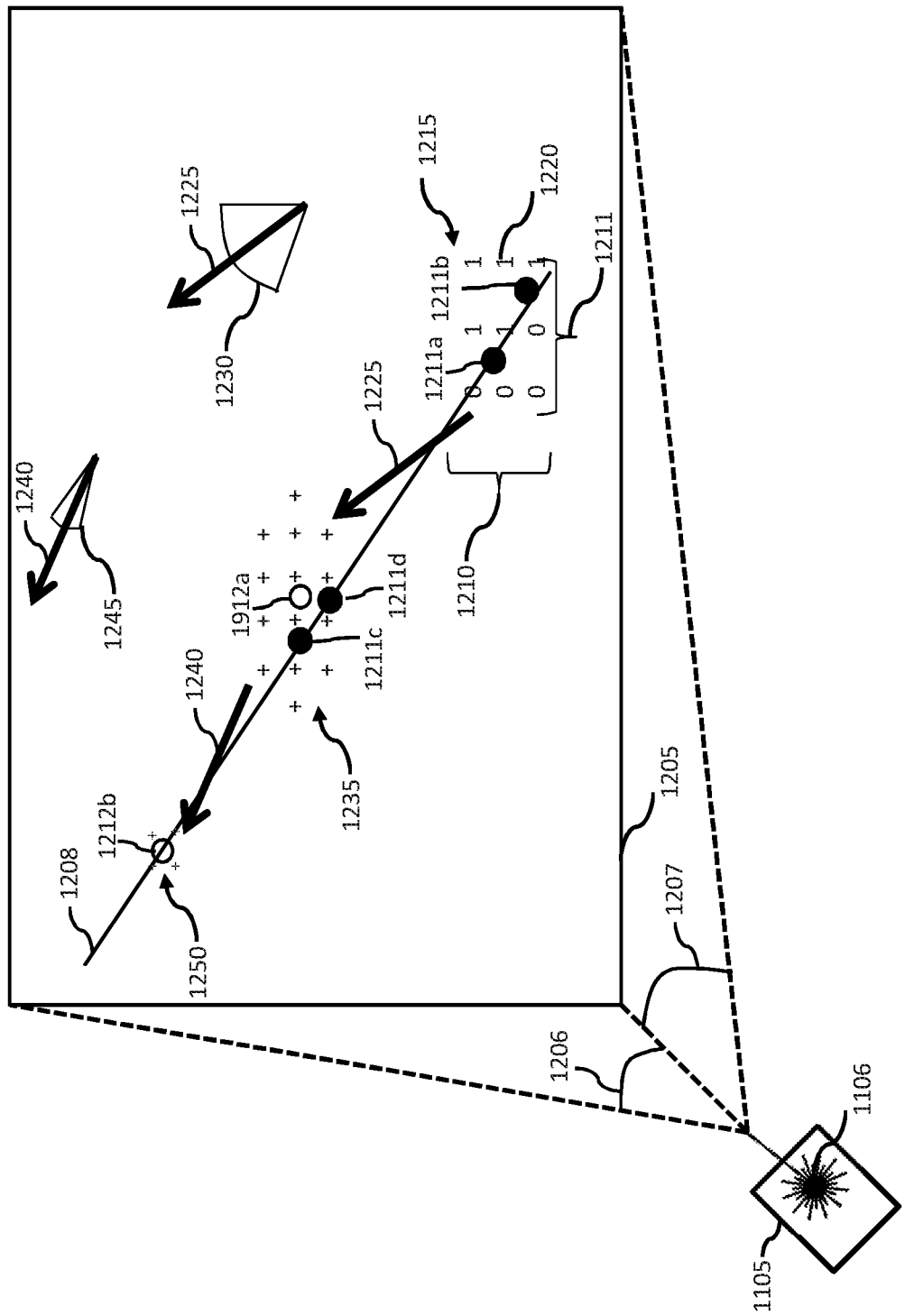
FIG. 12 illustrates several aspects of an extrapolation-based progressive boundary localization method.

FIG. 12 illustrated an embodiment wherein an angular range 1230 is associated with a vector 1225 extrapolated from a set of boundary locations 1211a and 1211b. This angular range or confidence value can be based on how well the boundary locations fit a particular shape. For example, the angular range or confidence value can be based on the mean square error of line or curve fit to the set of boundary location used to generate vector 1225 or estimated boundary location 1212a.

Turning in detail to FIG. 12 a LIDAR 1105 can have a FOV 1205 comprising a 2-D angular range comprising a range of possible elevation angles 1206 and a range of possible azimuthal angles 1207. An EPBL method performed by a LIDAR can scan a first search region comprising an elevation angular range 1210 and an azimuthal angular range 1211, to produce a first set of laser pulses. The LIDAR can measure a set of reflection 1215 corresponding to the outgoing sequence of laser pulses and can measure a TOF (e.g., 1220) corresponding with each laser pulse in the sequence. The LIDAR can calculate a set of locations (e.g., location 1211a and 1211b) on a TOF boundary 1208 and can further extrapolate a vector 1225 (and confidence range 1230) to an estimated boundary location 1212a. The LIDAR can dynamically steer a laser 1106 to generate a second set of laser pulses 1235 based on the vector 1225 or the estimated boundary location 1212a. The size of the second set of laser pulses 1235 can be based on the confidence value 1230. For example, if processing the set of boundary locations indicates a straight-line boundary with a small mean square error line fit, the angular range or confidence value associated with vector 1230 can be small and consequently the size of the second set of laser pulses 1235 can be small. Conversely, if the set of boundary locations indicate a boundary with a complex shape (e.g., a tree) the angular range 1230 can remain high, or the confidence value associated with estimated boundary location 1212a can remain low, thereby causing laser 1105 to dynamically scan a larger search region 1235. Over time as the set of boundary locations grows to include 1211c and 1211d the angular range 1245 associated with subsequent vectors 1240 indicating the location of subsequent estimated boundary locations 1212b can be reduced as the overall shape of the TOF boundary 1208 becomes evident. Hence the size of subsequent search region 1250 can be sized according to the confidence level of the LIDAR in the estimated boundary location 1212b. In one aspect a dynamically steered LIDAR can have a FOV with at least two dimensions (e.g., an elevation dimension indicated by an elevation angle and an azimuthal dimension indicated by an azimuthal angle).

Figure 13:
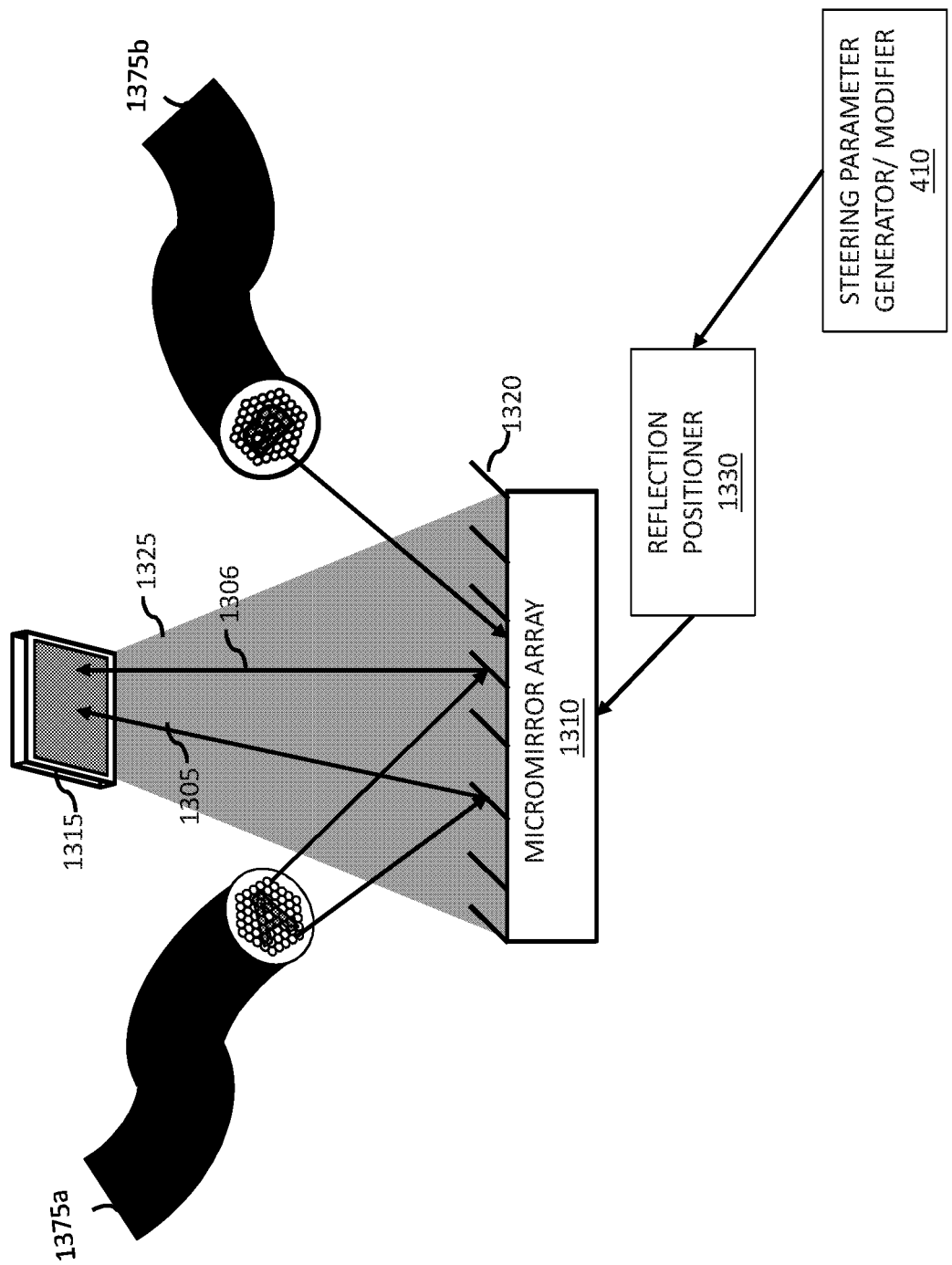
FIG. 13 illustrates a micromirror array multiplexor operable to multiplex laser reflections from a plurality of fiber optic image bundles onto a remote photodetector array, according to an embodiment of the present disclosure.

FIG. 13 illustrates a micromirror array 1310 placed in the field of view 1325 of a photodetector 1315 that can operate to multiplex light reflections from the output ends of two coherent fiber optic image bundles (CFOBs) 1375a and 1375b onto the photodetector array 1315. Exemplary micromirror arrays include the DLP6500FLQ DLP chip available from Texas Instruments Inc. of Santa Clara, Calif. Modern micromirror array chip can comprise over 4 million electronically positioned micromirrors (e.g., mirror 1320). Reflection positioner 1330 can be similar to an LCD driver chip and can signal individual micromirrors or groups of micromirrors to change position. In the position shown in FIG. 13 the micromirror array deflects light reflections from CFOB 1375a onto photodetector 1315, while light reflections from CFOB 1375b are not deflected towards the photodetector array 1315.

The micromirror array 1310 can be used to dynamically select inputs for the FOV 1325 of detector 1315. Micromirror array 1310 can occupy the entire FOV 1325 of a detector or photodetector array 1315. In various configurations the micromirror can then present to the detector 1315 light reflections from one of multiple CFOBs, light reflection multiple CFOBs simultaneously with light reflections from each CFOB directed to different parts of the detector. Alternatively, micromirror 1310 can then present to the detector 1315 light reflections from multiple CFOBs simultaneously with light from each CFOB directed to overlapping parts of the detector. Mirrors (e.g., 1320) in some or all of the micromirror arrays can be arranged at different angles to form angled reflectors to focus light reflections from all or portions of a CFOB onto a single detector element or a few detector elements. This can be useful for detecting if any optical fiber in a portion of the output surface of a CFOB is carrying a light reflection. Alternatively micromirrors can form a convex mirror arrangement, thereby spreading light reflections from a portion of the CFOB output surface over a wider portion of the detector (e.g., a wider range of elements in a detector array). In this way the micromirror array can magnify, combine, select and overlap portions of one or multiple CFOBs onto a photodetector 1315. The usefulness of the micromirror array is enhances by available light reflections from multiple FOVs based on the plurality of CFOBs.

Lidar with a Micromirror Array for Dynamic Reflection Distribution

In a related group of embodiments, a flash LIDAR can use a micromirror array to dynamically select one or more subsets of a FOV to transmit to a detector or detector array, and thereby improve the LIDAR resolution. While 2D digital cameras and 3D time-of-flight cameras are similar in some aspects, the different objectives makes scaling detector array in LIDARs challenging. Specifically, 2D digital cameras integrate the charge (photon current) at each pixel on the CCD array over a relatively large acquisition time (e.g., 10-100 milliseconds) often with little regard for when photons arrive within the acquisition time window. Subsequently, a readout circuit can read the charge stored on many pixels in a serial or parallel manner. Advances in the speed of readout circuitry have enables the resolution of 2D cameras (e.g., number of pixels) to outpace the complexity of the corresponding readout circuitry. For example, readout circuits in 2D cameras are servicing increasing numbers of pixels per readout circuit, thereby enabling higher resolution 2D digital camera. Conversely, 3D time-of-flight cameras are designed to determine when light reflection arrives at the detector array and thereby determine distance to a reflection source. Each pixel often has associated electronics (e.g., transimpedance amplifiers, phase comparators or timing circuits). Hence LIDAR resolution (numbers of pixels per array) has lagged behind that of 2D digital cameras and ways to increase this resolution remain a challenge.

Figure 14A:
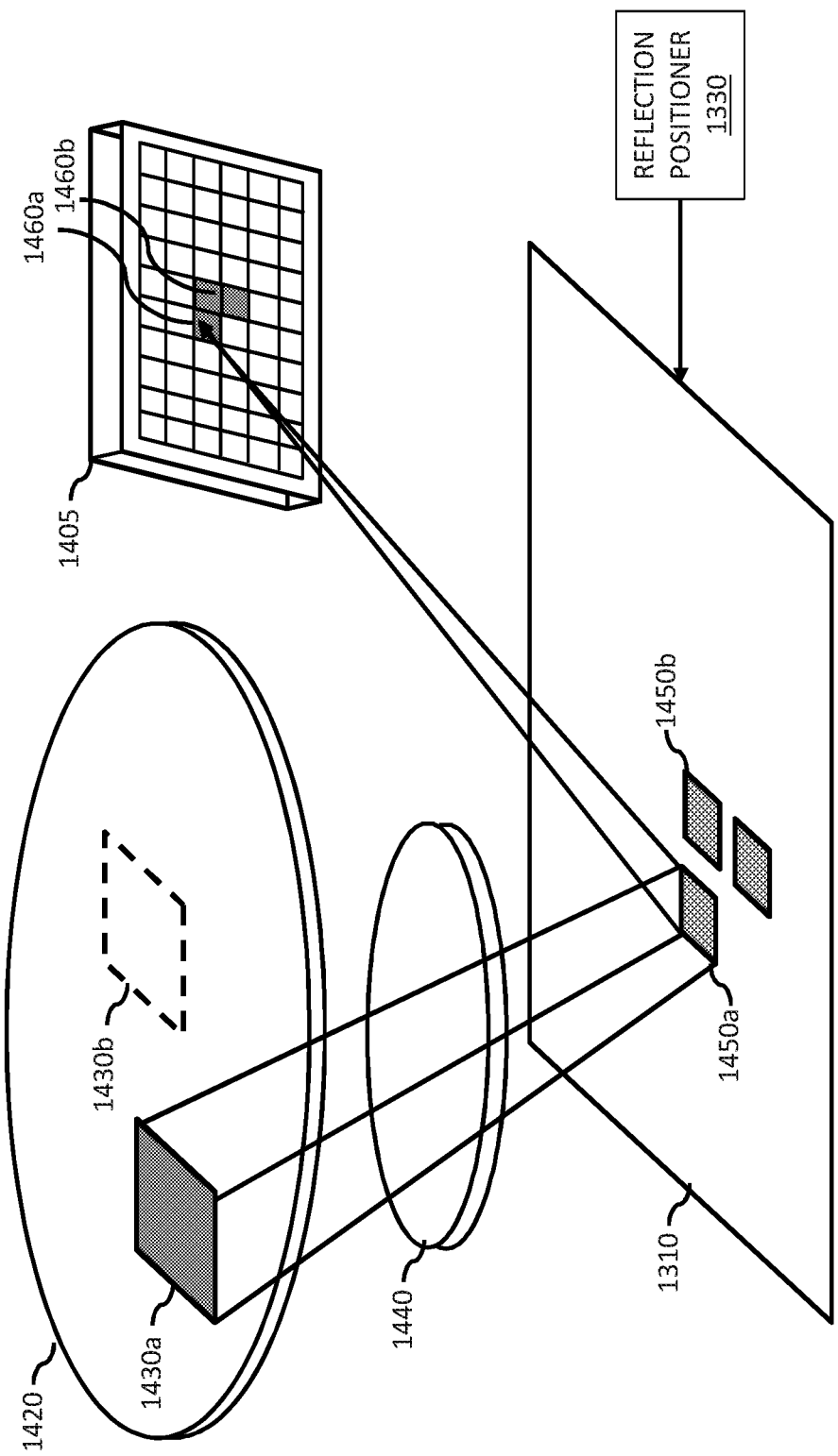
FIG. 14A illustrates a micromirror array operable to focus portions of a FOV onto a detector array according to an embodiment of the present disclosure.

FIG. 14A illustrates an embodiment of a flash LIDAR using a micromirror array to dynamically select subsets of the reflected FOV and thereby improve the resolution. Consider the following example: many state-of-the-art focal plane arrays for IR wavelengths have 128×128 elements (e.g., the TigerCub Flash Lidar available from Advanced Scientific Concepts Inc. or Santa Barbara Calif.). Consider that for a 64 degree azimuthal FOV each element receives laser reflections from 0.5 degrees of the FOV. This may seem like a high resolution but consider that at 100 m distance from such a flash lidar a 0.5 degree FOV resolution results in a 1 meter capture area (e.g., 100×Tan(0.5 degrees). Hence an unaided 128×128 element detector array has a 1 square meter resolution at 100 m. A challenge is to enhance this resolution and one way to achieve this is to only accept laser reflections from a portion of each 0.5×0.5 degree region of the FOV that serves each element in the array.

Figure 14B:
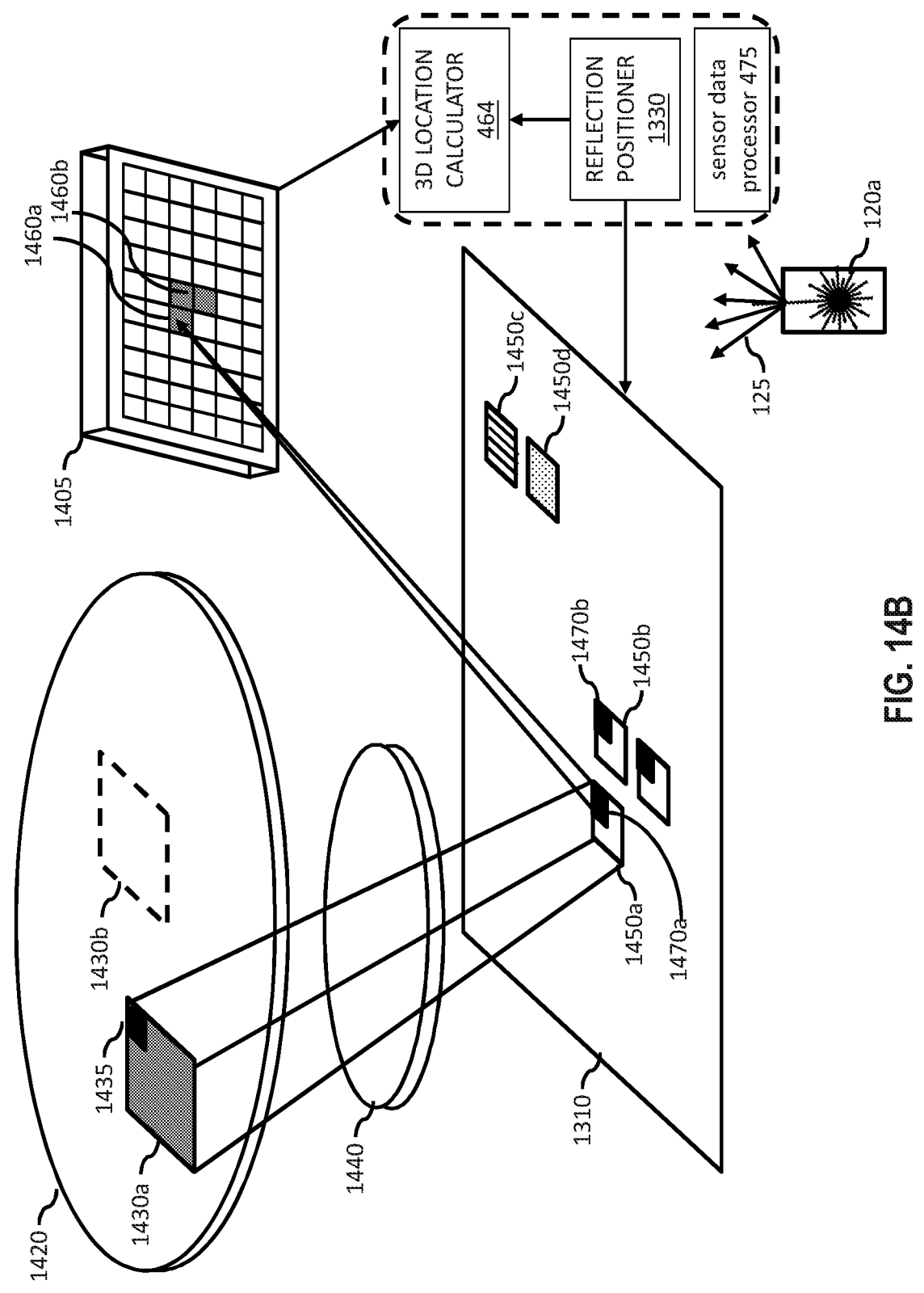

FIGS. 14A and 14B illustrate an embodiment where a micromirror array 1310 selects a sequence of portions of an incoming FOV to present to a detector 1405. In one example micromirror 1310 has 8 million micromirrors. Hence, the ratio of micromirrors to detector elements can be large (e.g., 488 micromirrors per detector element for a 128×128 element detector array and an 8M mirror DLP chip). Turning to FIG. 14A, micromirror array 1310 can be positioned in the FOV of a detector array 1405. Micromirror array 1310 can also have a FOV 1420 comprising the set of all directions that a light reflection can reach the micromirror array 1310. In one operating mode, portions 1430a and 1430b of the micromirror FOV 1420 can be focused using input lens 1440 onto corresponding portions 1450a and 1450b of micromirror array 1310. In one example the portions 1450a and 1450b can each comprise 488 micromirrors (corresponding to 8 million total mirrors divided by 128×128 total detector elements).

In one aspect, reflection positioner circuitry 1330 can function to adjust the 488 micromirrors in each of the portions 1450a and 1450b to focus light reflections from the corresponding portions of the micromirror FOV onto corresponding detector elements 1460a and 1460b respectively. For example, reflection positioner circuitry 1330 can instruct the 488 micromirrors in portion 1450a to form a concave reflector with a focal distance equal to the detector array. This can provide operation similar to direct illumination of the detector element by laser reflections from a portion of the FOV. This mode can be useful for detecting weak reflections, since many micromirrors can combine laser reflections from a single part of the FOV (e.g., a 0.5×0.5 degree portion corresponding to 488 micromirrors).

FIG. 14B illustrates another related operating mode in which a micromirror array utilizes only a fraction of the micromirrors in the portions 1450a and 1450b to deflect light reflections from corresponding portions of the FOV 1420 towards the detector array 1405. In the embodiment of FIG. 14B electronic circuitry 1480 can comprise reflection positioner circuitry 1330 and can instruct micromirror array 1310 to direct a first quarter of each group of 488 micromirrors (e.g., subsets 1470a and 1470b within portions 1450a and 1450b) towards the detector array. A controller 820 in electronic circuitry 1480 can instruct emitter 120a to emit a flash or beam of light, thereby illuminating some or all of FOV 1420. The detector array 1405 can measure and record the light reflections on the detector elements (e.g., a 128×128 array). Electronic circuitry 1480, including reflection positioner circuitry 1330 can subsequently instruct the micromirror array 1310 to position a second quarter of the 488 micromirrors in each portion (e.g., portion 1450a and 1450b) towards corresponding detector elements 1460a and 1460b. Controller 820 can instruct the light emitter to generate a second light pulse operable to illuminate some or all of a scene visible in FOV 1420. Detector array 1405 can again detect a second set of light reflections from the 128×128 detector elements. The electronic circuitry can generate several configurations thereby positioning a plurality of subsets of the micromirror in each portion of the array towards the detector array. Following each configuration of the micromirror the electronic circuitry can instruct the light emitter to generate one or more light pulses. Following each light pulse a set of light reflections are detected by detector array 1405. Detector array 1405 can detect the time of arrival of reflections and an arrival direction. The arrival direction can be indicated by the detector element (e.g., 1460a or 1460b) in the detector array that detects each light reflection. Electronic circuitry 1480 can further comprise a 3D location calculator 464. For the set of reflections corresponding to each micromirror array configuration the detected times of arrival and directions of arrival can be conveyed from the detector to the 3D reflection positioner using signals.

In one aspect, the 3D location calculator 464 can also receive data indicative of the configuration of the micromirror array 1310. For each light reflection in the set of light reflections the 3D location calculator can generate a 3D location indicative of a reflection location corresponding to the light reflection. The 3D location can be based on a detector element (e.g., the position in a detector array where the reflection was sensed) and further based on the configuration of the micromirror array (i.e., the subset of directions in the FOV being deflected towards the detector array). For example, a detected light reflection at detector element 1460a can indicate a reflection at a location encompasses by region 1430a in the FOV 1420. The micromirror array configuration can further refine the portion of the FOV to indicate the reflection came from the upper left portion 1435 of region 1430a. The time-of-flight between the corresponding emitted light pulse and a light reflection can indicate the range to the reflection location within region 1435. Hence the various micromirror array configurations enable more unique 2D locations (i.e., 2D reflection directions) to be generated (i.e., measured) in a corresponding 3D point cloud, than the number of photodetector elements in array 1405. For example the configuration of FIG. 14B enables 4 discrete configurations of the micromirror array 1310 and a 128×128 detector array to sense reflections in 4×128×128 unique directions.

Figure 15:
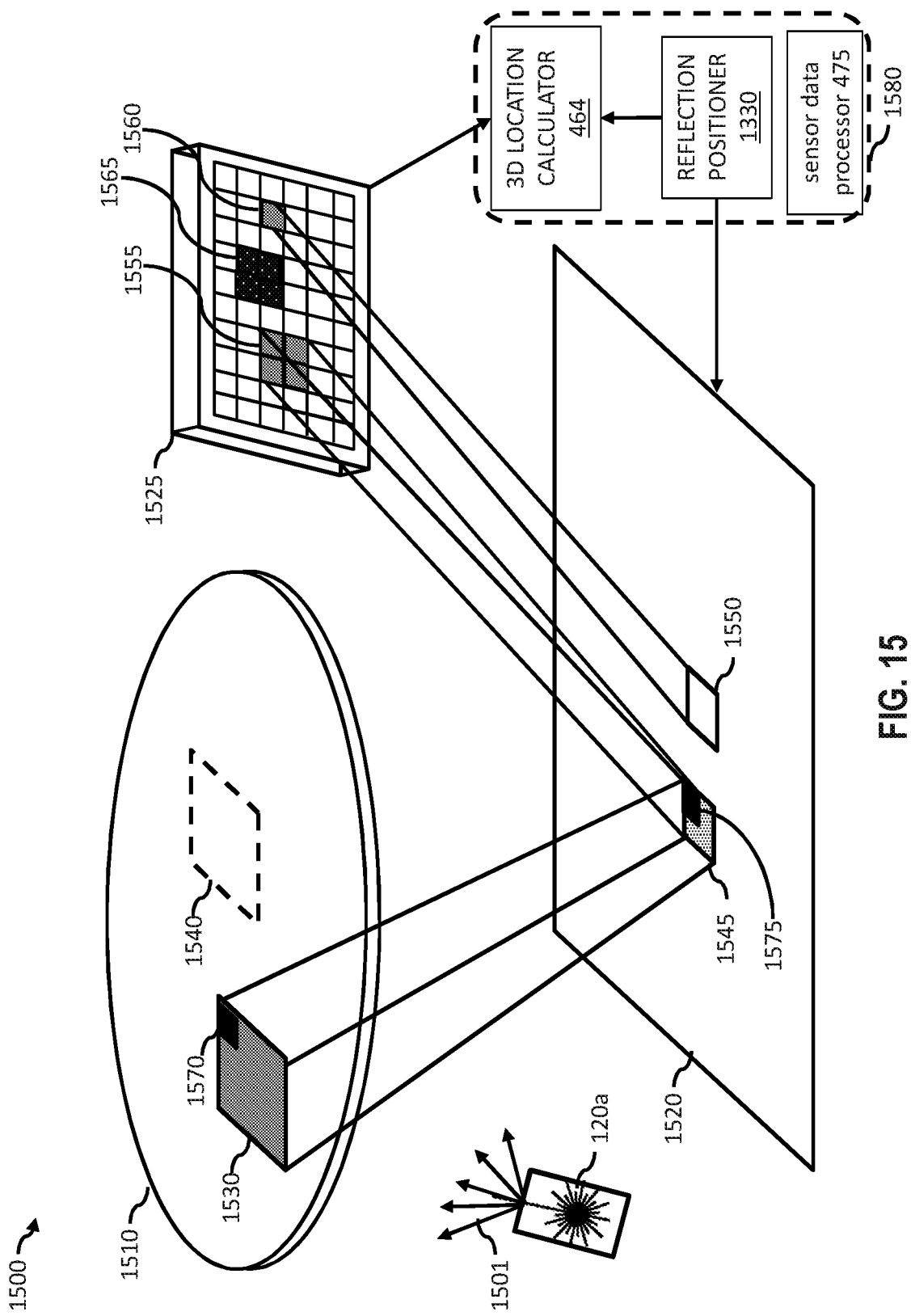
FIG. 15 illustrates several components of a LIDAR with a dynamically configured micromirror array in accordance with an embodiment of the present disclosure.

FIG. 15 illustrates a LIDAR 1500 comprising a laser transmitter 1505. Transmitter 1505 can transmit a laser beam 1501 in a plurality of directions in a FOV 1510. Laser reflections from directions in FOV 1510 can be focused onto a micromirror array 1520 in a deterministic or uniform manner using receiver optics 1515. For example, a lens can gather reflections from region 1530 of FOV 1510 onto region 1545 of the micromirror array. A region 1540 of the FOV (i.e., a subset of directions in FOV 1510) with a similar size to region 1530 can be focused onto a region 1550 of the micromirror array (i.e., a subset of the micromirrors) with a similar size to region 1545 of the micromirror array. Hence LIDAR 1500 can have a fixed ratio of the number of micromirrors per unit of solid angle (e.g., steradians or square degrees), as a function of location on the micromirror array configuration. However, the micromirror can be easily configured to distribute this fixed number of micromirrors per square degrees of FOV in a non-uniform manner to an associated detector array.

In one aspect, while the ratio of solid angle in FOV 1510 to micromirrors in the micromirror array can be fixed, the micromirror array can be dynamically configured (e.g., using reflection positioner circuitry 1330) to distribute the reflected laser beams in a dynamic manner. For example, reflected laser beams from region 1530 of FOV 1510 can be spread across region 1555 (comprising 4 pixels) of detector array 1525. Conversely, reflected laser beams from region

1540 are focused by region 1550 of the micromirror array on a single pixel 1560. In a similar way laser reflections from a subset 1575 of the micromirrors can be directed to a particular receiver element (e.g., pixel). In one embodiment, dynamically configuring micromirror array 1520 to spread laser reflection from a region 1530 across an increased number of receiver pixels can identify a time-of-flight (TOF) boundary (e.g., the edge of an object) in the FOV. For example sub-region 1570 of region 1530 can indicate a TOF boundary relative to the remainder of region 1530 and the TOF boundary can be identifies based in part on focusing subset 1575 of the micromirrors onto a dedicated group of pixels 1565 in detector array 1525 (i.e., across a wider angular range in the receiver array). LIDAR 1500 can iteratively localize a boundary by iteratively spreading a sub-region (e.g., 1570) identified to contain a TOF boundary across a greater portion of the receiver array (e.g., upon identification that region 1570 contains a TOF boundary, reconfiguring the micromirror array 1520 to focus a corresponding subset 1575 onto region 1565 or photodetector array 1525.

Micromirror array 1520 can be dynamically configured to increase or decrease the ratio of input solid angle from the FOV to output solid angle at the photodetector array based on variety of parameters such as scene classification (e.g., urban, suburban, or highway), the presence of a particular object (e.g., cars, people etc.) the presence of boundaries (e.g., a roadside, overpass or person outline). Micromirror array 1520 can also be configured to periodically enhance a sequence of regions in the FOV (e.g., to periodically enhance each portion of the FOV), thereby providing periodic resolution enhancement to one, some or all regions of the FOV.

In a related embodiment to LIDAR 1500 a digital camera can have a similar arrangement. Instead of a laser transmitter the digital camera can generate light or rely on ambient light. The digital camera can identify edges within the FOV (e.g., based on initial data received at a CCD array similar to receiver 1525). Upon identification of boundaries or edges in initial image data the digital camera can reconfigure a micromirror array to dynamically enhance boundary localization by spreading the boundary containing regions across more pixels in the receiver array. The output image can be a combination of data including uniform and non-uniform configurations of the micromirrors.

Micromirror Array for Resolution Enhancement

In one aspect a micromirror array can act like an electronically controllable transfer function for light, between an input lens of a camera and a photodetector array. For example, an analog micromirror array can perform a zoom function by deflecting a small portion of available FOV onto the photodetector array while simultaneously spreading the small portion over the detector. This has the effect of increasing image resolution (e.g., pixels per square degree of the field of view). However zooming in a portion of the FOV with the micromirror array can have the drawback of narrowing the FOV (i.e., zooming in on the scene). There are many applications where both enhanced resolution and a wide FOV are desirable. In one embodiment a method performed by an imaging system comprises providing at an aperture a 2D field of view (FOV) from a scene to a micromirror array having a first configuration, and thereby deflecting light with the micromirror array from the FOV onto a photodetector array. The method further comprises detecting with the photodetector array a first set of light measurements that span the FOV, processing the first set of light measurements and thereby identifying a region of interest (e.g., a portion of the FOV or scene containing an object edge or a face), in the FOV, having a first resolution at the detector array. The method further comprises configuring the micromirror array based at least in part on the identified region of interest and thereby detecting with the photodetector array a second set of light measurements spanning the FOV with a second resolution in the region of interest that is greater than the first resolution.

In one aspect the method can conserve the size (e.g., angular range) of the original FOV, thereby keeping people and pets in the frame and not distracting a user with an unwanted zoom effect. In another aspect the method can enhance image resolution while simultaneously conserving the original FOV; by configuring the micromirror array to compress light rays from one or more uninteresting portions of the FOV onto fewer pixels in the photodetector array (e.g., based on the first set of light measurements) and thereby enabling light rays from the region(s) of interest to be spread over more pixels to enhance the resolution. Therefore, by creating areas of sparse and denser light rays on the photodetector array simultaneously, the original FOV can be conserved.

In a system embodiment a processing subassembly with access to data from the photodetector array and micromirror configuration can correct for the distortive effect of the dense and sparse zones on the photodetector array and generate an eye-pleasing output image. In another embodiment, data from sensors or sources other than the photodetector array can be used to identify the region(s) of interest. In a second embodiment a method performed by an imaging system comprises: Processing sensor data indicative of a scene in the vicinity of a micromirror array and thereby identifying a region of interest in the sensor data, wherein the micromirror array has a field of view encompassing at least some of the scene, wherein the micromirror array comprises a plurality of micromirrors with an initial configuration that deflects light from the region of interest towards a detector array and thereby provides a first resolution at the detector array for the light from the region of interest, configuring the plurality of micromirrors in the micromirror array, based at least in part on the identified region of interest and thereby providing at the detector array a second resolution for light form the region of interest that is greater than the first resolution.

In a third embodiment the micromirror array can be part of a ranging subassembly for a light detection and ranging system (LIDAR). For example a flash LIDAR can illuminate a field of view (FOV) with flashes of light and gather reflections from the FOV at a photodetector array. A micromirror array can be configured based on an identified region of interest to non-uniformly spread the light reflections from the flashes of light based on the identified region of interest.

Figure 16:
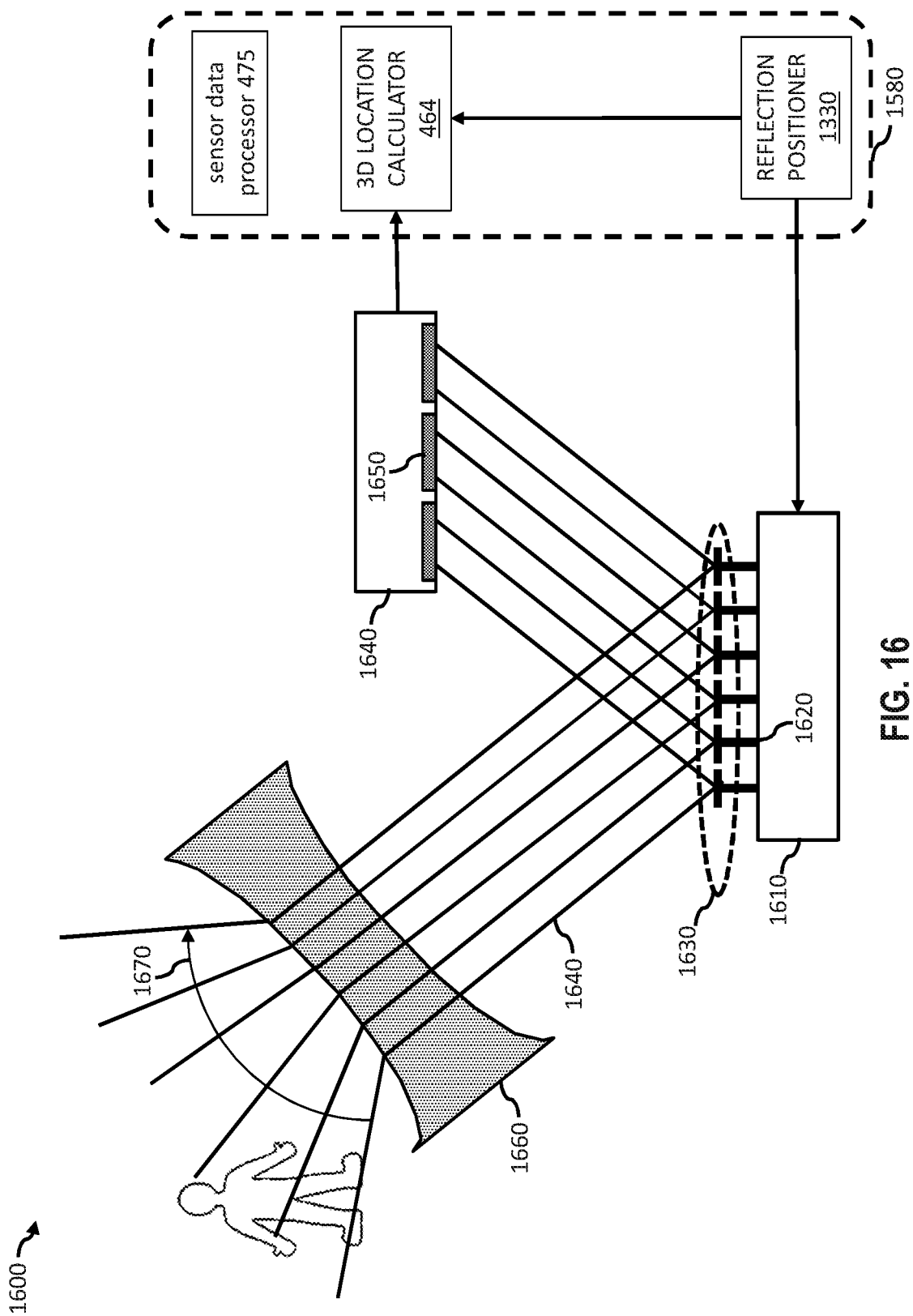
FIG. 16 illustrates several components of a micromirror array system operable to perform feedback based resolution enhancement in accordance with an embodiment of the present disclosure.
Figure 17:
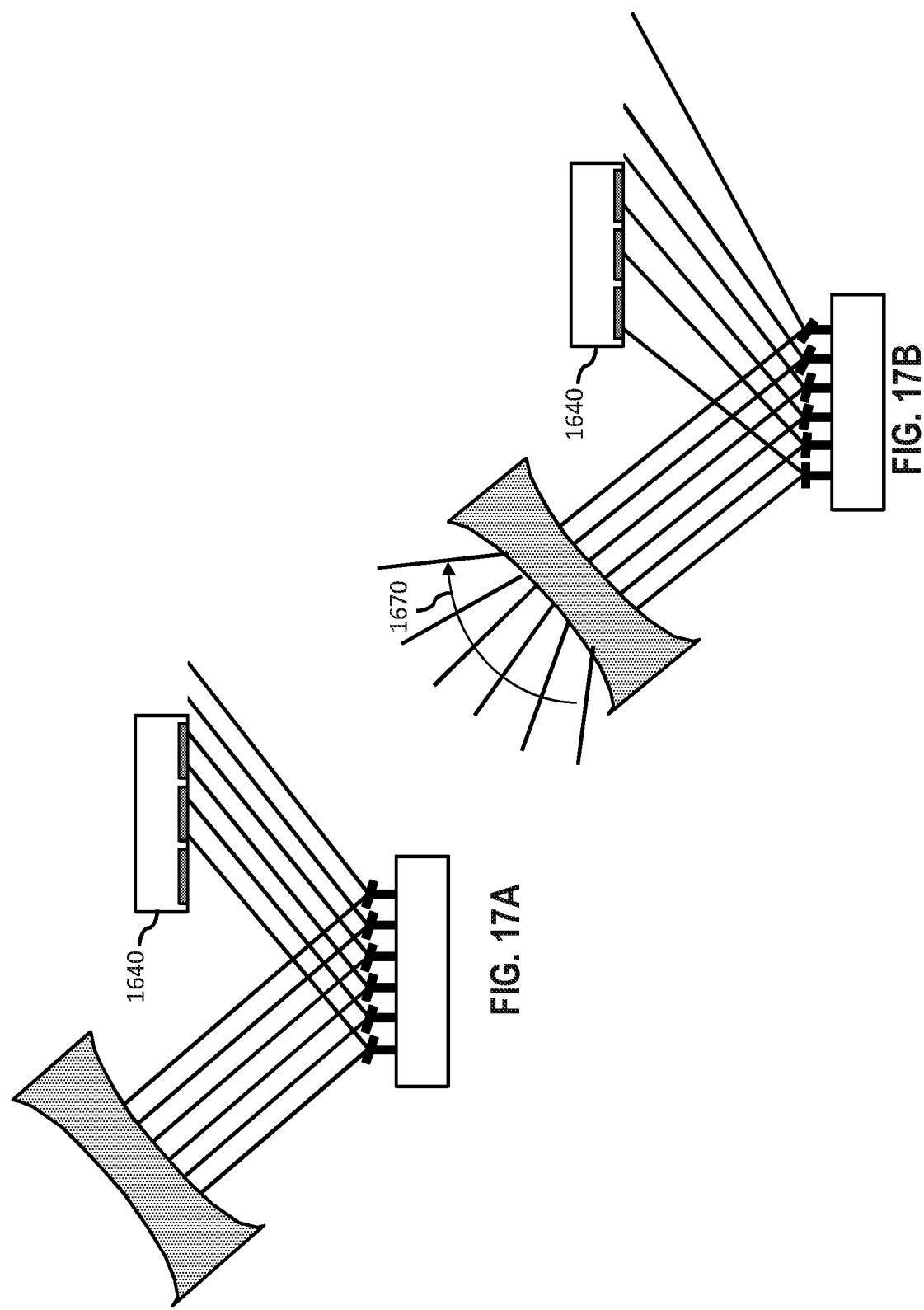
FIGS. 17A and 17B illustrate several components of a micromirror array system operable to perform feedback based resolution enhancement in accordance with an embodiment of the present disclosure.
Figure 18:
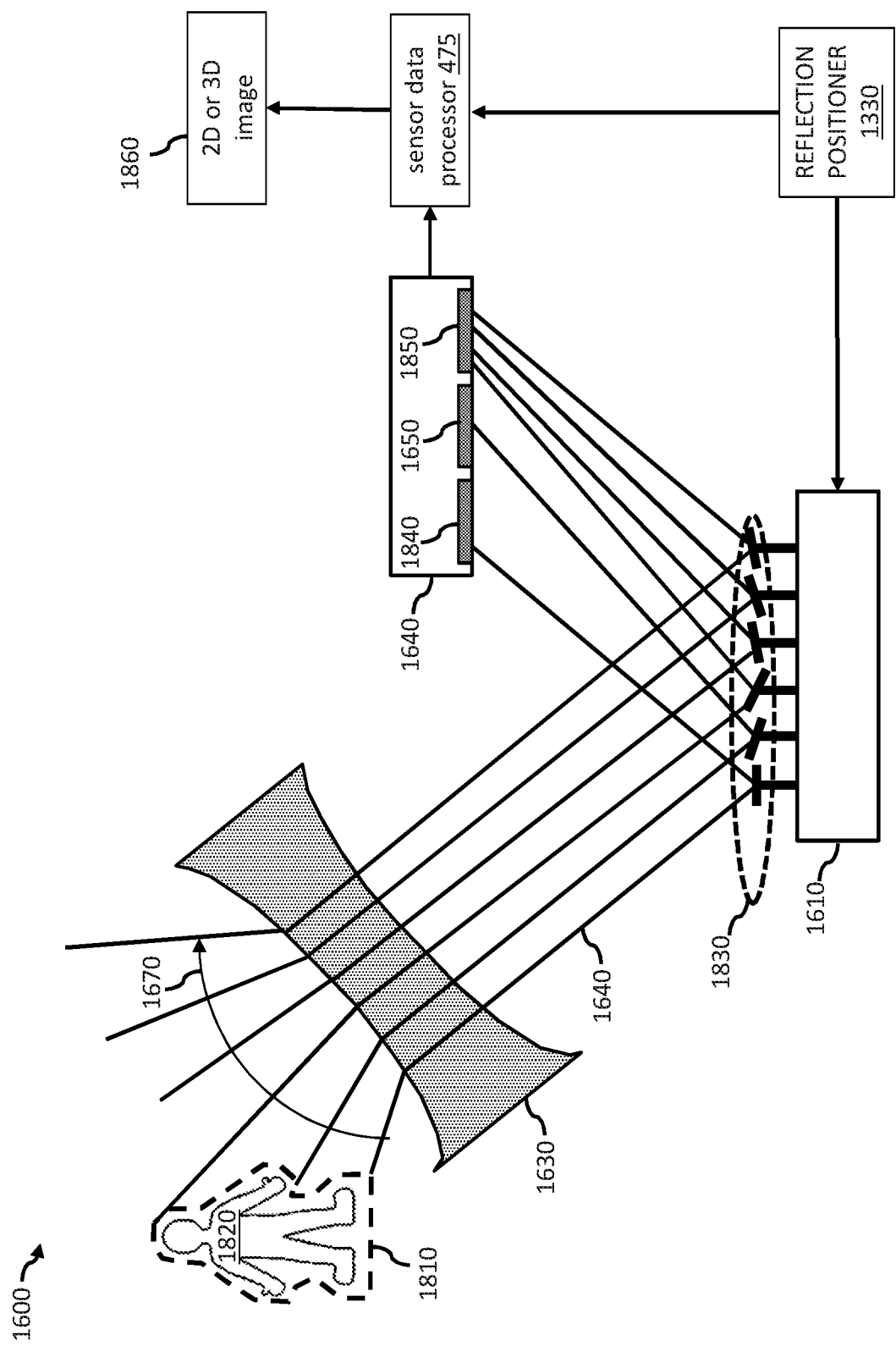
FIG. 18 illustrates several components of a micromirror array system operable to perform feedback based resolution enhancement in accordance with an embodiment of the present disclosure.

FIG. 16-18 illustrates an embodiment wherein an imaging system having a field of view, identifies one or more regions of interest from sensor data, reconfigures a micromirror array to increase the resolution at a detector array from the region of interest, decreasing the resolution at the detector array from another region of the FOV and thereby senses the entire FOV. Turning to FIG. 16 in one embodiment an imaging system 1600 comprises a reflection positioner 1330 to configure a micromirror array 1610, comprising a plurality of micromirrors (e.g., micromirror 1620), to a first configuration 1630 operable to deflect light (e.g., light ray 1640) from a scene in a vicinity of the micromirror array onto a detector array 1640 comprising a plurality of detector elements or pixels (e.g., element 1650). Imaging system 1600 can be a camera to generate a 2D image or a LIDAR to generate a 3 dimensional (3D) point cloud. Imaging system 1600 can further comprise a lens 1660 to gather light from a FOV indicated by angular range 1670. The FOV can be a 2 dimensional (2D) angular range and can comprise an angular area (e.g., 100×100 square degrees) comprising the set of all directions in which the imaging system 1600 can receive light beams from the local environment. In FIG. 16 the imaging system is illustrated receiving 6 light rays or beams and the micromirror array spreads the light rays uniformly across the detector array (e.g., with a resolution of 1 pixel per two light rays).

FIG. 17A illustrates that the micromirror array can be reconfigured to keep the same resolution but shift the light rays such that only a subset of the light rays are deflected towards the detector array. FIG. 17B illustrates a situation where the micromirror array spreads out the light rays thereby, magnifying a portion of the FOV and increasing the resolution to 1 pixel per light ray. However, a problem illustrated in FIG. 17B is that not all of the original FOV is sensed when the 6 light rays are uniformly spread out or magnified by the micromirror array. Hence, the detector array 1640 senses light rays from only half of the original angular range 1670.

Turning to FIG. 18 imaging system 1600 can further comprises circuitry (e.g., 3D location calculator 464 or sensor data processor 475) to process sensor data from the vicinity of the micromirror array to identify a region of interest in the scene. FIG. 18 illustrates an exemplary region of interest 1810 as a complex shaped portion of the FOV surrounding person 1820. Other exemplary regions of interest could be a 3D volume of space, a set of coordinates defining a region within the local environment of the imaging system 1600. Regions of interest could be portions of a FOV surrounding all cars or a portion of a FOV encompassing or containing a boundary, a feature or time-of-flight boundary from depth data.

In FIG. 18 the micromirror array 1610 is reconfigured to a second configuration 1830 (e.g., relative to the initial configuration 1630). The second configuration can be selected based at least in part on the identified region of interest. For example, in response to identifying a region of interest around person 1820 reflection positioner 1330 can reconfigure the micromirror array (or a subset of the micromirror array) based on the location or size of the region of interest. In the embodiment of FIG. 18 the second configuration 1830 provides at the detector array a second resolution that is greater than the first resolution for light from the region of interest. Additional FIG. 18 illustrates that the second configuration 1830 can increase the resolution at a first portion (including element 1650 and 1840) of the detector array 1640, while decreasing the resolution at a second portion (including element 1850) in order to sense the whole FOV 1670. For example, the resolution is increased for photodetector elements 1650 and 1840 from 1 pixel for 2 light rays to 1 pixel per light ray, while the resolution is reduced to element 1850 to 1 pixel for 4 light rays.

In one aspect the high resolution portion of the detector array can have a high resolution based on the total available number of detector elements or pixels in the detector array, based on the size of the region of interest (e.g., the solid angle or area of the field of view identified as a region of interest based on the sensor data). For example, 25% of a 1000×1000 pixel detector array can be devoted to resolution enhancement. If a small region of interest (e.g., 10×10 square degrees around a face in the background) is identified in a FOV the micromirror array can be reconfigured to provide a very high resolution of 2,500 pixels per square degree. Alternatively if a larger region of interest (e.g., a 1000 square degree complex shaped region around the boundary of a vehicle) is identified the micromirror array can be reconfigured to provide a high resolution of 250 pixels per square degree. In both cases the total number of pixels devoted to resolution enhancement can be 250,000 or 25% of the total detector array.

In one embodiment a method comprises the steps of firstly obtaining a micromirror array, comprising micromirrors in a first configuration; secondly deflecting with the micromirror array a first set of light beams from a FOV towards a detector array; thirdly detecting with the detector array the first set of light beams and thereby generating first sensor data; wherein a subset of the first set of light beams are from a region of interest in the FOV and have a first resolution at the detector array; fourthly in response to processing the first sensor data, reconfiguring at least some of the micromirrors; and fifthly deflecting, with the at least some of the micromirrors, a second set of light beams from the region of interest to the detector array; wherein the reconfiguration of the at least some of the light beams causes the second set of light pulses to have a second resolution at the detector array greater than the first resolution.

In one aspect the reflection positioner 1330 can receive a set of instructions to reconfigure the micromirror array and thereby implement a transfer function between a light rays from a FOV and their placement and resolution on a photodetector array (e.g., FOV 1670 of imaging system 1600). The transfer function can aim to enhance resolution of regions of interest in the FOV such as boundaries, objects of interest, or new objects in need of classification. This dynamically implemented transfer function creates dynamically defined relationship between light rays from the local environment and the sensor data measured by the detector array. With the micromirror array in a configuration to enhance resolution of region(s) of interest the corresponding high-resolution sensor data gathered at the detector array is effectively distorted by the non-uniform configuration of the micromirror array. Hence in one aspect the knowledge of the transfer function by the reflection positioner 1330 can be used by a sensor data processor 475 to process the high-resolution sensor data to enable it to be combined or displayed with other sensor data from other configurations. Sensor data from the detector array can be decoded using knowledge of the micromirror array configuration to place the sensor data in a common frame of reference (e.g., a 2D or 3D array forming an image).

In another embodiment a reflection positioner can generate a set of positioning instructions operable to configure the micromirror array. The positioning instructions can generate a high-resolution region within the micromirror array that functions to deflect light from the FOV with a higher than average resolution or a higher than original resolution towards a corresponding high-resolution portion or region of the detector array. The high resolution region of the micromirror array can deflect light from a region of interest. For example the high-resolution region can have the shape of a line that captures the outline of an object (e.g., a car) in the local environment. The high-resolution region of the detector array can generate high-resolution data. The high resolution data can be processed according to a transfer function indicating the configuration of the micromirror array. This processing of the high-resolution data can place high-resolution data in a common frame of reference or to account for the magnifying effect of the high-resolution region of the micromirror array. The sensor data processor 475 can combine sensor data at a uniform or average resolution (e.g., used to generate the positioning instructions) with high-resolution data to form a 2D or 3D image 1860. For example an imaging system can gradually configure a micromirror array by iteratively processing sensor data, configuring regions of the micromirror array and gradually refining the resolution of regions of interest at the detector array. A 2D or 3D image can be formed by the sensing data from the detector array with the micromirror in the final configuration. Alternatively the 2D or 3D image can combine sets of sensor data from a plurality of configurations leading to a final configuration. For example an initial uniform configuration of the micromirror can serve to provide a foundation of sensor data. Subsequent configurations can provide additional sets of high-resolution sensor data from subsets of the whole FOV that when combined with the first sensor data set provide an enhanced resolution image of all of the FOV with enhanced resolution in dynamically defined regions of interest. For example imaging system 1600 can generate a 2D image or a 3D point cloud comprising sensor data from a first uniform scan of the FOV and a subsequent adaptive resolution scan based on processing data from the first uniform scan.

In one aspect a region of interest, high-resolution region of a micromirror array or a high resolution region of a detector array can be selected based on sensed object, a classification of an object In a LIDAR embodiment a method comprises firstly generating with one or more emitters an outgoing set of light pulses; secondly deflecting with a micromirror array, having a field of view, a first set of light reflections corresponding to the outgoing set of light pulses; thirdly detecting at a detector array the first set of light reflections and thereby generating a first set of reflection data; fourthly processing the first set of reflection data and thereby identifying a location estimate for a region of interest in the FOV, wherein the region of interest has a first resolution at the detector; fifthly configuring the micromirror array based at least in part on the location estimate for the region of interest and thereby generating a second resolution at the detector for the region of interest that is greater than the first resolution.

Lidar with Direction Feedback

Figure 19:
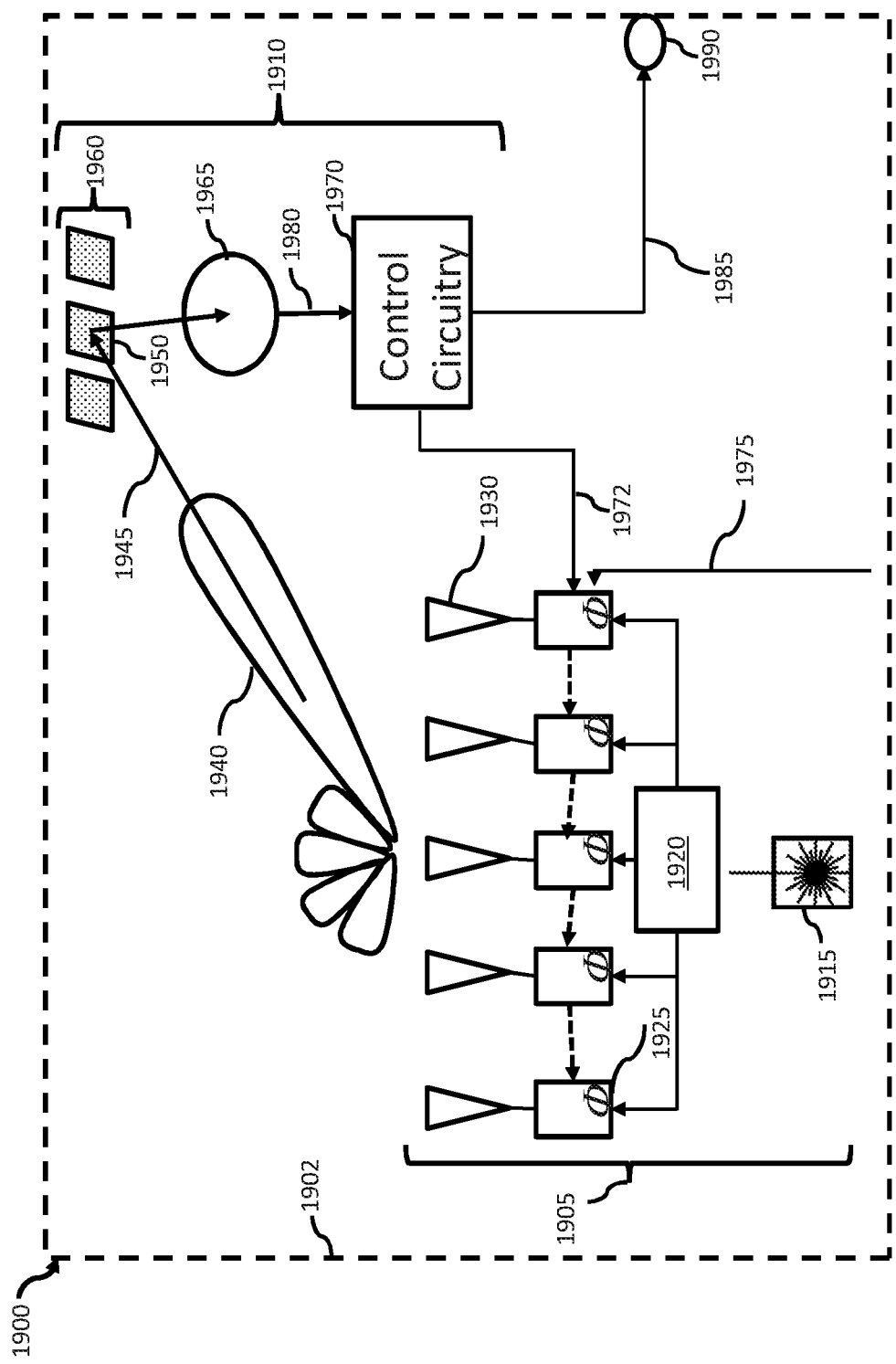
FIG. 19 illustrates several components to provide direction feedback control of an electronically steered LIDAR, in accordance with an embodiment of the present disclosure.

Turning to FIG. 19 a direction-detecting solid-state LIDAR 1900 can comprise an optical phased array (OPA) 1905, and direction feedback subassembly 1910 in a common LIDAR enclosure 1902. In most situations a laser detector in a LIDAR receives laser reflections from objects outside the LIDAR enclosure 1902. The direction feedback subassembly 1910 can function to directly detect the outgoing laser beam in one or more calibration directions. In several embodiments the direction feedback subassembly 1910 can include control circuitry to adjust the OPA and thereby provide a self-calibrating feedback-based solid-state LIDAR. The direction feedback subassembly circuitry can directly detect laser intensity in the one or more calibration directions and adjust the OPA to change the output laser direction. In one aspect the feedback circuitry can adjust the electrical signals to the phase shifters in the OPA to compensate for environmental factors such as temperature or humidity as well as manufacturing variations. In another aspect the electronic circuitry can function to confirm that the OPA and the laser detector in the circuitry are capable of both transmitting a laser beam in the one or more calibration directions and receiving the laser beam.

Turning in detail to FIG. 19, OPA 1905 can comprise a laser generator 1915 such as a laser diode and a laser splitter 1920 operable to divide a laser beam into a plurality of sub-beams. A plurality of phase shifters 1925 (e.g., a liquid crystal, thermal or phase shifter or Indium phosphide phase shifter) can delay each of the sub-beams by varying amounts. The resultant phase shifted sub-beams can be combined through a series of waveguides or antennas 1930 to produce a directed laser beam with a primary far field lobe 1940. In one aspect a direction feedback subassembly 1910 can comprise a reflector 1950 to reflect a laser beam transmitted by the OPA 1905 in a particular calibration direction 1945. Alternatively, a plurality of reflectors 1960 can reflect a laser beam in a plurality of calibration directions. Recent advancements in reflective liquid crystal materials have made electronically switchable mirrors possible (e.g., the e-Transflector product line available from Kent Optoelectronics of Hopewell Junction, N.Y.). In one aspect one reflector 1950 or reflector array 1960 can be electronically switchable mirrors. These electronically switchable mirrors can function to reflect the laser beam towards reflector 1965 when switches ON and function to be transparent to a laser beam (e.g., in direction 1945), when turned OFF, thereby passing a laser beam beyond the enclosure 1902. In this way, an embodiment of direction feedback subassembly 1910 with electronically switchable mirrors can function to measure the directional accuracy of OPA in the reflective state (i.e., the ON state) of the switchable mirrors 1950 or 1960. Laser detector 1965 can be a dedicated photodiode or can be at least a part of the laser detector for the LIDAR 1900. Laser detector 1965 can receive a reflected laser beam and generate a reflection signal 1980 indicating the intensity of the laser reflection. The intensity of the laser reflection and the reflection signals can be compared with an expected value by control circuitry 1970. Alternative control circuitry 1970 can generate a perturbation signal 1985 to the phase shifters 1925 that cause the phase shifters to vary the main lobe direction 1940 and thereby identify an offset adjustment signal 1972 that causes the maximum intensity in the calibration direction 1945, thereby indicating that the main lobe 1940 is pointed in the calibration direction 1945. In a related embodiment laser detector 1965 can detect the laser intensity in the calibration direction and similar directions directly. The offset adjustment signal 1972 can function to adjust the OPA to account for variations due to temperature or aging of the LIDAR.

Similarly, control circuitry can function to adjust the OPA to provide maximal intensity in the calibration direction when a corresponding input calibration signal 1975 commands the OPA to point in the calibration direction 1945. In one embodiment control circuit 1970 can assert a malfunction indicator signal 1985 (e.g., a 0-12V value) if, in response to the input calibration signal 1975 the OPA does orient the laser beam in the calibration direction 1945. The malfunction indication signal 1985 can connect the control circuit or the laser detector 1965 to a malfunction indicator pin 1990 on the enclosure 1902 of LIDAR 1900. In one embodiment both the input calibration signals 1975 and the offset adjustment signal can be generated by the control circuitry 1970.

Figure 20:
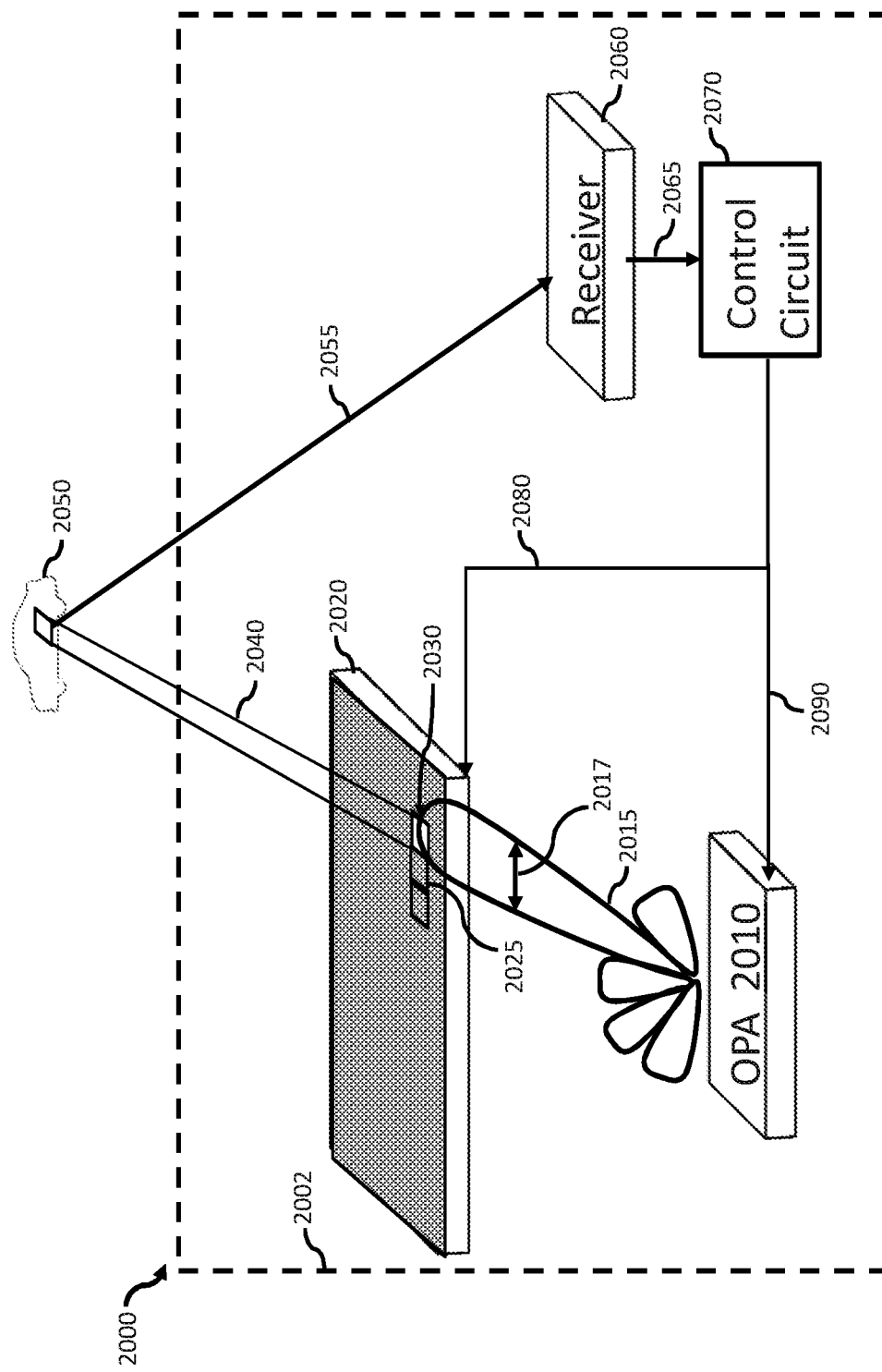
FIG. 20 illustrates several components of an electronically steed LIDAR with a selective light modulator, in accordance with an embodiment of the present disclosure.

FIG. 20 illustrates a solid state LIDAR 2000 inside an enclosure 2002. OPA 2010 can generate a near-field beam pattern and a primary far-field lobe 2015 with a beam-width 2017. LIDAR 2000 can further comprise a selective light modulator (SLM) 2020 such as an LCD array that can selectively make pixels such as 2030 and 2025 transparent and opaque. SLM 2020 can function to collimate or narrow the beam-width of far-field lobe 2015, thereby generating a collimated beam 2040. Collimated laser beam 2040 can have a smaller spot size than the uncollimated far-field lobe 2017 and can hence reflect from a distinct region of reflection target 2050. For example far-field lobe 2015 can span a range of directions in a field of view and the SLM can be configured to transmit laser light from the far-field lobe in a subset of the range of directions. Laser detector 2060 can receive reflected laser pulse 2055 and generate reflected signal 2065. In one aspect control circuitry 2070 can control OPA 2010 to adjust the far-field lobe direction to generate the maximum laser intensity for a particular aperture (e.g., subset of transparent pixels such as 2030 in the SLM). In another aspect the aperture in the SLM can be varied for a given OPA setting to achieve enhanced laser resolution for selectively transmitting subsets of the full far-field beamwidth. For example, an OPA may be capable of generating 10000 distinct laser beam directions. The SLM can comprise 400×600 LCD pixels and can thereby provide 220000 distinct collimated laser beams 2040. In one aspect a set of laser steering parameters can both scan the far-field lobe laser beam of the OPA and can control the configuration of transparencies of the elements in the SLM. In one embodiment the OPA is adjusted to particular laser direction and a sequence of SLM aperture shapes transmit subsets of the far-field laser beam cross-section thereby enhancing the accuracy and resolution of laser range finding by providing a smaller output laser cross section. A SLM can comprise a 2D array of pixels, segments or elements each with electronically controllable transparency.

In one embodiment A LIDAR comprises one or more emitters to generate a set of laser pulses, wherein each of the plurality of laser pulses has a corresponding direction and beam cross-section; a selective light modulator positioned in the path of the plurality of laser pulses, comprising a plurality of segments with electronically controllable transparency, and control circuitry operable coupled to the selective light modulator and configured to control for each of the plurality of pulses at the electronically controllable transparency of at least some of the plurality of segments to block laser light from at least some the corresponding beam cross-section of the each laser pulse and transmit at least some of the each laser pulse with a transmitted beam cross-section smaller than the corresponding beam cross-section.

Figure 21:
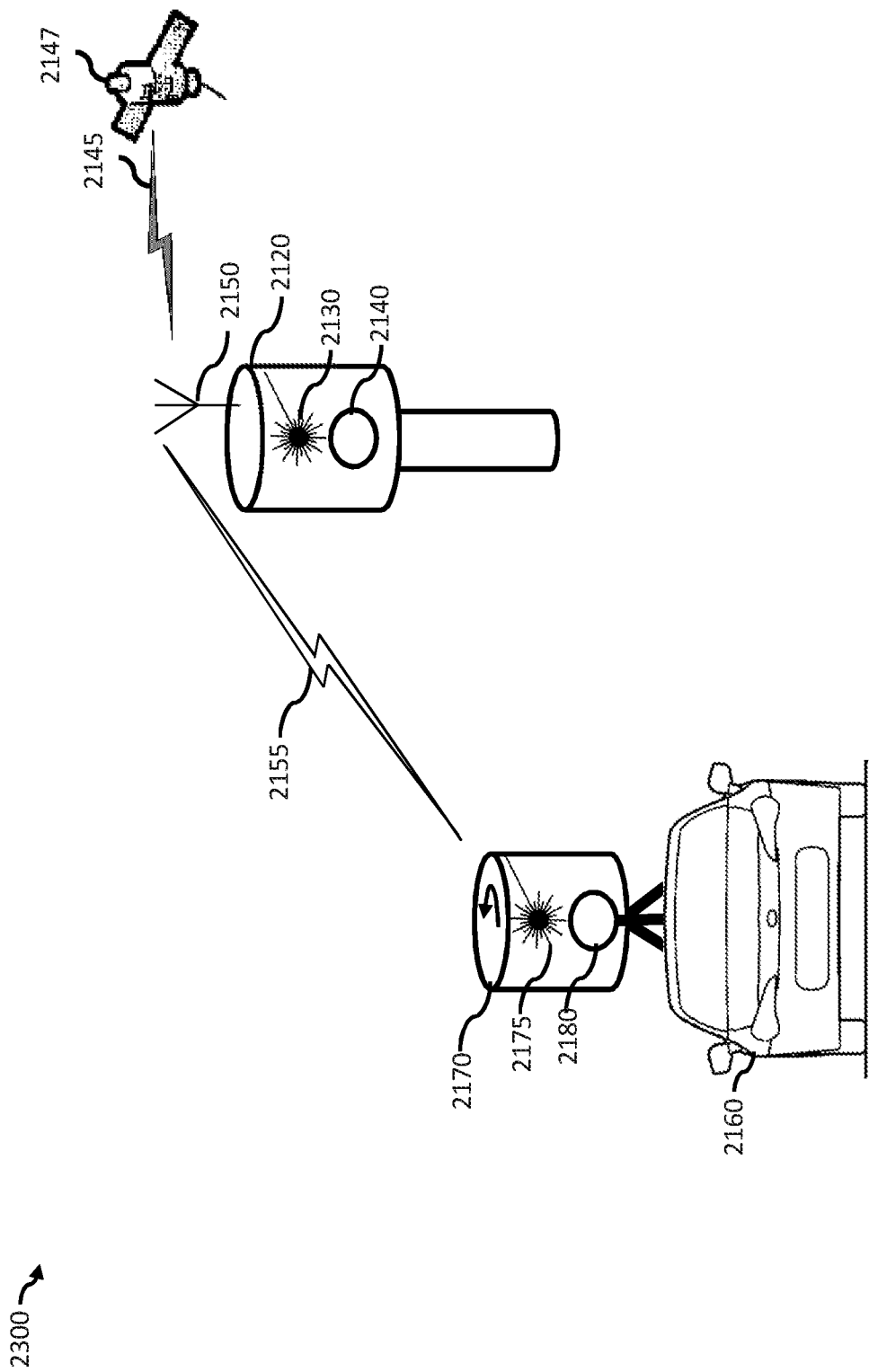
FIG. 21 illustrates a remote LIDAR transmitting data to a vehicle based laser range finding system in accordance with an embodiment of the present disclosure.

Turning to FIG. 21 a system for augmenting a vehicle based LIDAR with range data from a roadside LIDAR is provided. In one aspect, roadside LIDAR 2120 can be mounted at an intersection or on an overpass and can comprise a laser transmitter 2130 a laser receiver 2140 to perform laser range finding in a local environment (e.g., at an intersection). Roadside LIDAR 2120 can further comprise a transmitter 2150 to transmit range information from the local environment to passing vehicles 2160a and 2160b in signals 2155. For example signals 215 can be RF signals or optical signals and transmitter 2150 can be an RF transmitter or optical transmitter. In one aspect of several embodiments signals 2155 can further comprise location information (e.g., GPS coordinates) indicative of the location of the roadside LIDAR. The location information can be gathered in signals 2145 from satellites 2147 or other localization sources. The location information can also be programmed into the roadside LIDAR upon installation. In one aspect of several embodiments, the location information can enable a passing vehicle 2160a equipped with a LIDAR system 2170 to receive the roadside LIDAR signals 2155 including roadside range data, calculate an offset or transformation for the roadside range data based on the vehicle location and the roadside LIDAR location information, transform the roadside range data based on the offset or calculated transformation and combine the transformed roadside range data with vehicle-based range data from LIDAR 2170.

In a related embodiment a vehicle based laser range finding system 2170 can comprise a receiver to receive roadside range data and roadside LIDAR location data, a processor to transform the Roadside range data to a common origin (e.g., reference point) relative to onboard range data, wherein the transform is based on the roadside LIDAR location information and the vehicle location and finally combine the transformed roadside range data with onboard range data. The transformed roadside range data and the onboard range data can be combined in a single 3D point cloud.

FIG. 22A illustrates a dynamically configurable wind deflector 2225. A lead truck 2210 or vehicle has a wind deflector in a recessed position operable to deflect wind over the trailer of the truck. A drafting truck 2220 or vehicle has a dynamically configurable wind deflector 2225 comprising a movable wind deflector operable to extend from a recessed position (e.g., illustrated by wind deflector 2215) to an extended position 2225. The extended position can be achieved by extending the configurable wind deflector 2225 by a distance 2230 when truck 2220 is drafting a lead truck. The configuration and extension length 2230 can be controlled based on the measured fuel economy of one or both vehicles 2210 and 2220 in order to increase fuel economy. In one aspect airflow from the lead truck can be guided over the drafting truck with less turbulence or wind resistance when the configurable wind deflector is in the extended position, thereby increasing fuel economy. FIG. 22.B illustrates a related embodiment whereby the configurable wind deflector has openings 2240a and 2240b to divert airflow from underneath the wind deflector. The extension distance 2220 can be based on observed fuel economy or following distance 2235. The dynamically configurable wind deflector can be controlled by circuitry in the front or rear truck that senses or obtains data indicating one or more aspect of the drafting truck such as following distance 2235 or fuel economy. In one embodiment a system comprises a configurable wind deflector operable to be in a recessed position and an extended position; and circuitry to obtain data indicate of an aspect a first vehicle when the first vehicle is drafting a second vehicle and to reconfigure the configurable wind deflector from the recessed position to the extended position in response to the data. The data can be sensor data indicating the following distance 2235 or fuel economy. The data can be an indication that a first vehicle is drafting the second vehicle.

While the above description contains many specificities, these should not be construed as limitations on the scope of any embodiment, but as exemplifications of various embodiments thereof. Many other ramifications and variations are possible within the teachings of the various embodiments. Thus the scope should be determined by the appended claims and their legal equivalents, and not by the examples given.

Any of the methods (including user interfaces) described herein may be implemented as software, hardware or firmware, and may be described as a non-transitory computer-readable storage medium storing a set of instructions capable of being executed by a processor (e.g., computer, tablet, smartphone, etc.), that when executed by the processor causes the processor to control perform any of the steps, including but not limited to: displaying, communicating with the user, analyzing, modifying parameters (including timing, frequency, intensity, etc.), determining, alerting, or the like.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
operating a micromirror array, comprising a plurality of micromirrors, in a first configuration to deflect light from a scene in a vicinity of the micromirror array onto a detector array;
processing sensor data from the vicinity of the micromirror array to identify a region of interest in the scene,
wherein the first configuration of the micromirror array provides a first resolution at the detector array for light from the region of interest,
reconfiguring, the micromirror array to a second configuration, based at least in part on the identified region of interest, and thereby providing at the detector array a second resolution greater than the first resolution for light from the region of interest, wherein the first configuration provides a first field of view to the detector array, comprising a 2D range of directions in which the detector array can receive light from the scene, and wherein the step of reconfiguring the micromirror array to the second configuration comprises:
enhancing the resolution in the region of interest while continuing to provide the whole first field of view to the detector array by:
reconfiguring a first subset of the plurality of micromirrors to provide at the detector array the second resolution, greater than the first resolution, for light from the region of interest; and
reconfiguring a second subset of the plurality of micromirrors to provide at the detector array a third resolution, that is less than the first resolution, for light from a portion of the first field of view.

2. The method of claim 1 further comprising the step of generating by reconfiguring the micromirror array a high resolution region on the detector array wherein the second resolution is greater than the first resolution.

3. The method of claim 1 wherein the step of processing the sensor data comprises identifying an object and wherein the region of interest encompasses the object.

4. The method of claim 1 wherein the region of interest is a complex shaped region comprising at least 5 sides in a field of view of the detector.

5. The method of claim 1 wherein the region of interest is a complex shaped region having at least 5 sides and encompassing an object in the scene.

6. The method of claim 1 further comprising the step of: with the micromirror array in the first configuration, sensing light from the scene using the detector array to generate the sensor data.

7. The method of claim 1 further comprising; with the micromirror array in the first configuration generating with one or more emitters a set of light pulses; detecting at the detector array a set of light reflections; obtaining the sensor data by processing the set of light reflections; wherein the sensor data comprises for each of the set of light reflections a corresponding time-of-flight; and wherein the region of interest is identified based on the time-of-flights corresponding to at least some of the set of light reflections.

8. The method of claim 7 wherein processing the set of light reflections comprises identifying a time-of-flight boundary and identifying the region of interest based on the identified time-of-flight boundary.

9. The method of claim 1 further comprising; with the micromirror array in the first configuration, generating with one or more emitters, a set of light pulses; detecting at the detector array a set of light reflections; obtaining the sensor data by processing the set of light reflections; wherein the sensor data comprises for each of the set of light reflections a corresponding time-of-flight; and wherein the second configuration of the micromirror array is based on the time-of-flights corresponding to at least some of the set of light reflections.

10. A method comprising:
operating a micromirror array comprising a plurality of micromirrors in a first configuration to deflect,
with the micromirror array, a first set of light beams from a field of view onto a detector array, with an average resolution at the detector array;
detecting, with the detector array, the first set of light beams and thereby generating first sensor data, wherein a subset of the first set of light beams is from a region of interest in the field of view and has a first resolution at the detector array;
in response to processing the first sensor data, reconfiguring at least some of the micromirrors; and
deflecting, with the at least some of the micromirrors, a second set of light beams from the region of interest to the detector array, wherein reconfiguring the at least some of the micromirrors causes the second set of light beams to have a second resolution at the detector array that is greater than the first resolution, and
reconfiguring a sub-set of the plurality of micromirrors to deflect light from a portion of the field of view outside the region of interest onto the detector array with a third resolution at the detector array that is less than the average resolution.

11. The method of claim 10 wherein the at least some of the micromirrors has a complex shape within the micromirror array and wherein the at least some of the micromirrors is selected based on processing the first sensor data.

12. A method comprising:
operating a micromirror array comprising a plurality of micromirrors in a first configuration to deflect a first set of light beams from a field of view onto a detector array with the micromirror array, with an average resolution at the detector array;
detecting the first set of light beams with the detector array and thereby generating first sensor data, wherein a subset of the first set of light beams is from a region of interest in the field of view and has a first resolution at the detector array;
reconfiguring at least some of the micromirrors in response to processing the first sensor data;
deflecting a second set of light beams from the region of interest to the detector array with the at least some of the micromirrors; wherein the step of reconfiguring the at least some of the micromirrors causes the second set of light beams to have a second resolution at the detector array greater than the first resolution, wherein reconfiguring the at least some of the micromirrors provides the second resolution at the detector array with greater than the average resolution; and reconfiguring a second at least some of the micromirrors to provide a third resolution at the detector array that is less than the average resolution, whereby the detector array senses from all of the field of view.

13. The method of claim 12 wherein the region of interest is selected based on an object boundary detected in the first sensor data.

14. A method comprising:

operating a micromirror array, comprising a plurality of micromirrors, in a first configuration to deflect light from a field of view in a vicinity of the micromirror array onto a detector array; wherein the first configuration of the micromirror array is operable to provide a first resolution at the detector array for a subset of the light from a region of interest;

reconfiguring the micromirror array to a second configuration, based at least in part on processing sensor data from the field of view, and thereby providing, at the detector array, a second resolution greater than the first resolution for light from the region of interest; and providing, with the first configuration of the micromirror array, a third resolution at a portion of the detector array, and providing, with the second configuration of the micromirror array, a fourth resolution at the portion of the detector array that is less than the third resolution.

15. The method of claim 14 wherein the field of view comprises a 2D angular range of directions and further comprising the step of deflecting light with the micromirror array in the second configuration from the 2D angular range of directions onto the detector array.

* * * * *